US012651450B2

(12) United States Patent
Kim et al.

(10) Patent No.: US 12,651,450 B2
(45) **Date of Patent: \*Jun. 9, 2026**

(54) NPU AND APPARATUS FOR TRANSCEIVING FEATURE MAP IN A BITSTREAM FORMAT

(71) Applicant: DEEPX CO., LTD., Seongnam-si (KR)

(72) Inventors: Lok Won Kim, Seongnam-si (KR); Ha Joon Yu, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,373

(22) Filed: Nov. 13, 2023

(65) Prior Publication Data

US 2024/0338937 A1      Oct. 10, 2024

Related U.S. Application Data

(63) Continuation of application No. 18/317,728, filed on May 15, 2023, now Pat. No. 11,893,783.

(30) Foreign Application Priority Data

Apr. 10, 2023    (KR) ........................ 10-2023-0046740

(51) Int. Cl.
*G06V 10/82*        (2022.01)
*G06V 10/77*        (2022.01)
(52) U.S. Cl.
CPC .......... *G06V 10/82* (2022.01); *G06V 10/7715* (2022.01)

(58) Field of Classification Search
CPC ........................... G06V 10/82; G06V 10/7715
See application file for complete search history.

(56) References Cited

U.S. PATENT DOCUMENTS

| | | | | |
|---|---|---|---|---|
| 6,728,775 | B1 * | 4/2004 | Chaddha .............. | H04N 19/527 |
| | | | | 375/E7.092 |
| 11,657,230 | B2 * | 5/2023 | Lee ........................... | G06T 7/10 |
| | | | | 382/103 |
| 2007/0274381 | A1 * | 11/2007 | Li ........................ | H04N 19/164 |
| | | | | 375/E7.134 |
| 2010/0232340 | A1 * | 9/2010 | Godor .................. | H04N 21/631 |
| | | | | 370/312 |

(Continued)

FOREIGN PATENT DOCUMENTS

| | | | | | |
|---|---|---|---|---|---|
| CN | | 113762237 A | * | 12/2021 | ........... G06F 18/214 |
| KR | 10-2022-0136806 A | | | 10/2022 | |

(Continued)

*Primary Examiner* — Qun Shen
(74) *Attorney, Agent, or Firm* — Bridgeway IP Law Group, PLLC; Jihun Kim

(57)        ABSTRACT

A neural processing unit (NPU) for decoding video or feature map is provided. The NPU may comprise at least one processing element (PE) to perform an inference using an artificial neural network. The at least one PE may be configured to receive and decode data included in a bitstream. The data included in the bitstream may comprise data of a base layer. Alternatively, the data included in the bitstream may comprise data of the base layer and data of at least one enhancement layer. The data of the base layer included in the bitstream may include a first feature map. The data of the at least one enhancement layer included in the bitstream may include a second feature map.

20 Claims, 22 Drawing Sheets

(56) References Cited

U.S. PATENT DOCUMENTS

| | | | | |
|---|---|---|---|---|
| 2020/0167943 A1* | 5/2020 | Kim | ........................ | G06T 7/579 |
| 2021/0127140 A1* | 4/2021 | Hannuksela | ........... | G06N 3/084 |
| 2022/0210435 A1 | 6/2022 | Kang et al. | | |
| 2023/0086521 A1* | 3/2023 | Gao | ........................ | H04N 19/88 |
| | | | | 375/240.26 |
| 2023/0196072 A1* | 6/2023 | Zou | ...................... | G06N 3/0495 |
| | | | | 706/22 |
| 2023/0276421 A1* | 8/2023 | Yang | .................... | H04W 24/08 |
| | | | | 370/329 |
| 2023/0376626 A1* | 11/2023 | Haerterich | ......... | G06F 21/6254 |

FOREIGN PATENT DOCUMENTS

| | | | | | |
|---|---|---|---|---|---|
| TW | 202247650 | A | 12/2022 | | |
| TW | 202312031 | A | 3/2023 | | |
| WO | WO-2010112074 | A1 * | 10/2010 | ............ | H04L 47/10 |
| WO | WO-2023207348 | A1 * | 11/2023 | | |

* cited by examiner

ENCODING APPARATUS

INPUT IMAGE (E.G. PICTURE)

10a 10a-10

IMAGE PARTITIONING UNIT 10a-70

DPB

MEMORY

FILTER 10a-60

10a-20

INTER PREDICTOR (10a-21)

INTRA PREDICTOR (10a-22)

10a-30

10a-31

10a-32

TRANSFORMER 10a-33

QUANTIZER 10a-40

ENTROPY ENCODER

BITSTREAM 10a-34

DEQUANTIZER 10a-35

INVERSE TRANSFORMER 10a-50

NPU AND APPARATUS FOR TRANSCEIVING FEATURE MAP IN A BITSTREAM FORMAT

CROSS-REFERENCE TO RELATED APPLICATIONS

This application is a continuation application of the U.S. Utility patent application Ser. No. 18/317,728 filed on May 15, 2023, which claims the priority of Korean Patent Application No. 10-2023-0046740 filed on Apr. 10, 2023, in the Korean Intellectual Property Office, the disclosure of which is incorporated herein by reference.

BACKGROUND OF THE DISCLOSURE

Technical Field

The present disclosure relates to apparatus and method for transceiving feature maps extracted using MPEG-VCM.

Background Art

Continuous development of the information and communication industry has led to a worldwide spread of broadcasting services having a high definition (HD) resolution.

As a result, users of such services have become accustomed to high-resolution and high-definition images and/or videos, and demand has increased for high picture quality, that is, high-resolution, high-quality video such as ultra high definition (UHD) video.

Standardization of coding technology for UHD (4K, 8K, or higher) video data was completed in 2013 through high efficiency video coding (HEVC).

HEVC is a next-generation video compression technology that has a higher compression rate and lower complexity than the previous H.264/AVC technology. HEVC is a key technology for effectively compressing the massive amounts of data of HD and UHD video content.

HEVC performs block-based encoding like previous compression standards. However, unlike H.264/AVC, there is a difference in that only one profile exists. There are a total of eight core encoding technologies included in HEVC's unique profile, to include technologies for hierarchical coding structure, transformation, quantization, intra prediction coding, inter picture motion prediction, entropy coding, loop filtering, and others.

Since adoption of the HEVC video codec in 2013, immersive video and virtual reality services using 4K and 8K video images have expanded, and a versatile video coding (VVC) standard has been developed. VVC, which is called H.266, is a next-generation video codec that aims to improve performance by more than two times compared to HEVC.

H.266 (VVC) was developed with the goal of more than twice the efficiency of the previous generation codec, i.e., H.265 (HEVC). VVC was initially developed with 4K or higher resolution in mind, but it was also developed for 16K-level ultra-high-resolution image processing for the purpose of responding to 360-degree images due to the expansion of the VR market. In addition, as the HDR market gradually expands due to the development of display technology, VVC supports not only 10-bit color depth but also 16-bit color depth, and supports 1000 nits, 4000 nits, and 10000 nits of brightness expression. In addition, as it is being developed with the VR market and 360-degree video market in mind, it supports variable frame rates ranging from 0 to 120 FPS.

Advancement of Artificial Intelligence

Artificial intelligence (AI) is also developing rapidly. AI refers to artificially imitating human intelligence, that is, intelligence capable of performing recognition, classification, inference, prediction, and control/decision making.

Due to the development of artificial intelligence technology and the increase in Internet of Things (IOT) devices, it is predicted that traffic between machines will explode, and image analysis that depends on the machine will be widely used.

SUMMARY OF THE DISCLOSURE

The inventors of the present disclosure have recognized the problem that a technique for image analysis by a machine has not yet been developed.

Accordingly, an object of the present disclosure is to provide a neural processing unit (NPU) for effectively performing image analysis by a machine.

A neural processing unit (NPU) according to an example of the present disclosure may be an NPU for decoding video or feature map. The NPU may include at least one processing element (PE) to perform an inference using an artificial neural network. A bitstream received by the at least one PE may include base layer data and may alternatively include base layer data and data of at least one enhancement layer. The base layer data included in the received bitstream may be configured to be decoded by the at least one PE. Alternatively, the base layer data and the at least one enhancement layer data included in the received bitstream may be configured to be decoded by the at least one PE. The base layer data included in the bitstream may include a plurality of first feature maps, and the data of the at least one enhancement layer may include a plurality of second feature maps.

An NPU according to another example of the present disclosure may be an NPU for encoding video or feature map. The NPU may include at least one processing element (PE) to perform an inference using an artificial neural network, the at least one PE configured to receive and encode a transmitted video or feature map. The at least one PE may be further configured to output a bitstream including data of a base layer and data of at least one enhancement layer. The base layer data included in the bitstream may include a plurality of first feature maps, and the data of the at least one enhancement layer may include a plurality of second feature maps.

A VCM decoder according to another example of the present disclosure may be a VCM decoder for decoding video and/or feature map. The VCM decoder may include at least one processing element (PE) to perform an inference using an artificial neural network, the at least one PE configured to receive and decode data included in a bitstream. The data included in the bitstream may include data of a base layer; or the data of the base layer and data of at least one enhancement layer. The base layer data included in the bitstream may include a plurality of first feature maps, and the data of the at least one enhancement layer may include a plurality of second feature maps.

A VCM encoder according to another example of the present disclosure may be a VCM encoder for encoding video and/or feature map. The VCM encoder may include at least one processing element (PE) to perform an inference using an artificial neural network, the at least one PE configured to receive and encode a transmitted video or feature map. The at least one PE may be further configured to output a bitstream including data of a base layer and data of at least one enhancement layer. The base layer data included in the bitstream may include a plurality of first feature maps, and the data of the at least one enhancement layer may include a plurality of second feature maps.

According to the NPU of the present disclosure, it is possible to effectively perform image analysis.

DETAILED DESCRIPTION OF THE EMBODIMENT

Figure 1:
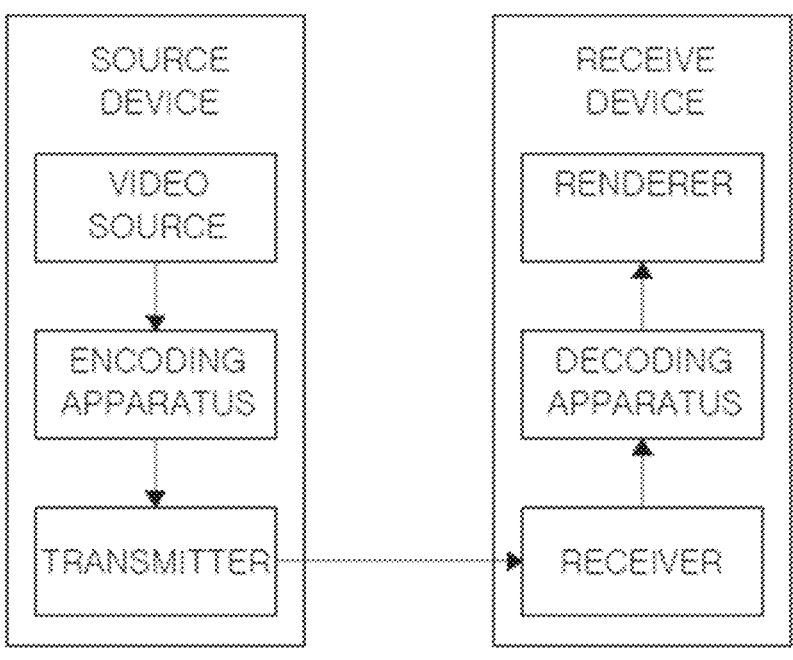
FIG. 1 is a schematic diagram of a video/image coding system.

Specific structural or step-by-step descriptions for the embodiments according to the concept of the present disclosure disclosed in the present specification or application are merely illustrative for the purpose of describing the embodiments according to the concept of the present disclosure. The examples according to the concept of the present disclosure may be carried out in various forms and are not interpreted to be limited to the examples described in the present specification or application.

Various modifications and changes may be applied to the examples in accordance with the concept of the present disclosure and the examples may have various forms so that the examples will be described in detail in the specification or the application with reference to the drawings. However, it should be understood that the examples according to the concept of the present disclosure is not limited to the given examples, but includes all changes, equivalents, or alternatives which are in accordance with the spirit and technical scope of the present disclosure.

Terminologies such as first and/or second may be used to describe various components but the components are not limited by the above terminologies. The above terminologies are used to distinguish one component from the other component, for example, a first component may be referred to as a second component without departing from a scope in accordance with the concept of the present invention and similarly, a second component may be referred to as a first component.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween. Other expressions which describe the relationship between components, for example, "between," "adjacent to," and "directly adjacent to" should be interpreted in the same manner.

Terminologies used in the present specification are used only to describe specific examples, and are not intended to limit the present disclosure. A singular form may include a plural form if there is no clearly opposite meaning in the context. In the present specification, it should be understood that terms "include" or "have" indicate that a feature, a number, a step, an operation, a component, a part, or a combination thereof described in the specification is present, but do not exclude a possibility of presence or addition of one or more other features, numbers, steps, operations, components, parts, or combinations thereof, in advance.

If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideally or excessively formal meaning if it is not clearly defined in this specification.

When the examples are described, a technology which is well known in the technical field of the present disclosure and is not directly related to the present disclosure will not be described. The reason is that unnecessary description of a well-known technology is omitted in order to clearly convey the gist of the present disclosure without obscuring the gist by the unnecessary description.

The present disclosure relates to video/image coding. For example, the methods/examples disclosed in the present disclosure may be related to Versatile Video Coding (VVC) standard (ITU-T Rec. H.266), the next-generation video/image coding standard after VVC, or other standards related to video coding. The other standards may include High Efficiency Video Coding (HEVC) standard (ITU-T Rec. H.265), essential video coding (EVC) standard, AVS2 standard, and the like.

The present disclosure presents various embodiments related to video/image coding, and unless otherwise stated, the embodiments may be combined with each other.

In the present disclosure, a video may mean a set or series of images according to the passage of time. A picture generally means a unit representing one image in a specific time period, and a slice/tile is a unit constituting a part of a picture in coding. A slice/tile may include one or more coding tree units (CTUs). One picture may consist of one or more slices/tiles. One picture may be composed of one or more tile groups. One tile group may include one or more tiles.

A pixel or pel may mean a minimum unit constituting one picture (or image). Also, "sample" may be used as a term corresponding to a pixel. A sample may generally represent a pixel or a value of a pixel, may represent only a pixel/pixel value of a luma component, or may represent only a pixel/pixel value of a chroma component. Alternatively, the sample may mean a pixel value in the spatial domain, or when such a pixel value is transformed into the frequency domain, it may mean a transform coefficient in the frequency domain.

A unit may represent a basic unit of image processing. The unit may include at least one specific region of a picture and information related to the region. One unit may include one luma block and two chroma (e.g., Cb, Cr) blocks. A unit may be used interchangeably with terms such as a block or an area in some cases. In general, an M×N block may include samples (or sample arrays) or a set (or arrays) of transform coefficients including M columns and N rows.

Definitions of Terms

Here, in order to help the understanding of the disclosure proposed in the present specification, terminologies used in the present specification will be defined in brief.

NPU is an abbreviation for a neural processing unit and refers to a processor specialized for an operation of an artificial neural network model separately from the central processor (CPU).

AI accelerator: As an AI computation accelerator, it may refer to an NPU.

ANN is an abbreviation to perform an inference using an artificial neural network and refers to a network which connects nodes in a layered structure by imitating the connection of the neurons in the human brain through a synapse to imitate the human intelligence.

Information about a structure of an artificial neural network: Information including information on the number of layers, the number of nodes in a layer, a value of each node, information on an operation processing method, information on a weight matrix applied to each node, and the like.

Information on data locality of artificial neural network: Information that allows the neural processing unit to predict the operation order of the artificial neural network model processed by the neural processing unit based on the data access request order requested to a separate memory.

DNN: An abbreviation for a deep neural network and may mean that the number of hidden layers of the artificial neural network is increased to implement higher artificial intelligence.

CNN: An abbreviation for a convolutional neural network and is a neural network which functions similar to the image processing performed in a visual cortex of the human brain. The convolutional neural network is known to be appropriate for image processing and is known to be easy to extract features of input data and identify the pattern of the features.

Transformer: Transformer is an ANN widely used for natural language processing tasks such as machine translation, text classification, and sentiment analysis. A Transformer is a type of neural network based on the idea of self-attention. Self-attention is a mechanism by which a model can evaluate the importance of different portions of input data when making predictions. Transformer uses a multi-head attention mechanism. That is, self-attention can be performed multiple times with different weights to capture more complex patterns in the input data.

Visual Transformer: A Visual Transformer is a type of neural network designed for image classification tasks. Like the Transformer, the Visual Transformer can use self-attention to evaluate the importance of different parts of the input image when making predictions. Visual Transformers are particularly suited to image classification tasks because they can process input images of varying sizes and learn complex spatial relationships between different portions of an image.

Kernel means a weight matrix applied to the CNN, Transformer, and the like. The value of the kernel can be determined through machine learning.

Hereinafter, the present disclosure will be described in detail by explaining examples of the present disclosure with reference to the accompanying drawings.

FIG. 1 schematically shows an example of a video/image coding system.

Referring to FIG. 1, a video/image coding system may include a source device and a receive device. The source device may transmit encoded video/image information or data in the form of a file or streaming to the receive device through a digital storage medium or a network.

The source device may include a video source, an encoding apparatus, and a transmitter. The receive device may include a receiver, a decoding apparatus, and a renderer. The encoding apparatus may be referred to as a video/image encoder, and the decoding apparatus may be referred to as a video/image decoder. The transmitter may be included in the encoding apparatus. The receiver may be included in the decoding apparatus. The renderer may include a display unit, and the display unit may be configured as a separate device or external component.

The video source may acquire a video/image through a process of capturing, synthesizing, or generating a video/image. A video source may include a video/image capture device and/or a video/image generating device. A video/image capture device may include, for example, one or more cameras, a video/image archive containing previously captured video/images, and the like. A video/image generating device may include, for example, a computer, tablet, or smartphone, and may, electronically or through other means, generate a video/image. For example, a virtual video/image may be generated through a computer, and the like. In this case, the video/image capturing process may be substituted for the process of generating related data.

The encoding apparatus may encode the input video/image. The encoding apparatus may perform a series of procedures such as prediction, transformation, and quantization for compression and coding efficiency. The encoded data (encoded video/image information) may be output in the form of a bitstream.

The transmitter may transmit encoded video/image information or data output in the form of a bitstream to the receiver of the receive device in the form of a file or streaming through a digital storage medium or a network. The digital storage medium may include various storage media such as a flash drive, SD card, CD, DVD, Blu-ray disc, HDD, SSD, or the like. The transmitter may include an element for generating a media file through a predetermined file format, and may include an element for transmission through a broadcast/communication network. The receiver may receive/extract the bitstream and transmit it to the decoding apparatus.

The decoding apparatus may decode the video/image by performing a series of procedures such as inverse quantization, inverse transformation, and prediction corresponding to the operation of the encoding apparatus.

The renderer may render the decoded video/image. The rendered video/image may be displayed through the display unit.

Figure 2:
FIG. 2 is a schematic diagram of a video/image encoder.

FIG. 2 illustrates a configuration of a video/image encoder.

Hereinafter, a video encoding apparatus may include an image encoding apparatus.

Referring to FIG. 2, the encoding apparatus 10a may be configured to include an image partitioning unit 10a-10, a predictor 10a-20, a residual processor 10a-30, an entropy encoder 10a-40, an adder 10a-50, a filter 10a-60, and a memory 10a-70. The predictor 10a-20 may include an inter predictor 10a-21 and an intra predictor 10a-22. The residual processor 10a-30 may include a transformer 10a-32, a quantizer 10a-33, a dequantizer 10a-34, and an inverse transformer 10a-35. The residual processor 10a-30 may further include a subtractor 10a-31. The adder 10a-50 may be referred to as a reconstructor or a reconstructed block generator. The above-described image partitioning unit 10a-10, predictor 10a-20, residual processor 10a-30, entropy encoder 10a-40, adder 10a-50, and filter 10a-60 may be configured by one or more hardware components (e.g., encoder chipset or processor) according to an embodiment. In addition, the memory 10a-70 may include a decoded picture buffer (DPB), and may be configured by a digital storage medium. The hardware component of the memory 10a-70 may be configured as an internal or external component.

The image partitioning unit 10a-10 may divide an input image (or a picture, a frame) input to the encoding apparatus 10a into one or more processors. As an example, the processor may be referred to as a coding unit (CU). In this case, the coding unit may be divided recursively according to a quad-tree binary-tree ternary-tree (QTBTTT) structure from a coding tree unit (CTU) or largest coding unit (LCU). For example, one coding unit may be divided into a plurality of coding units having a lower depth based on a quad tree structure, a binary tree structure, and/or a ternary structure. In this case, for example, a quad tree structure may be applied first and a binary tree structure and/or a ternary structure may be applied later. Alternatively, the binary tree structure may be applied first. A coding procedure according to the present disclosure may be performed based on the final coding unit that is no longer divided. In this case, the maximum coding unit may be directly used as the final coding unit based on coding efficiency according to image characteristics. Alternatively, if necessary, the coding unit may be recursively divided into coding units of a lower depth, so that a coding unit having an optimal size may be used as a final coding unit. Here, the coding procedure may include procedures such as prediction, transformation, and restoration, which will be described later. As another example, the processor may further include a predictor (PU) or a transformer (TU). In this case, the predictor and the transformer may be divided or partitioned from the above-described final coding unit, respectively. The predictor may be a unit of sample prediction, and the transformer may be a unit for deriving a transform coefficient and/or a unit for deriving a residual signal from the transform coefficient.

A unit may be used interchangeably with terms such as a block or an area in some cases. In general, an M×N block may represent a set of samples or transform coefficients including M columns and N rows. A sample may generally represent a pixel or a value of a pixel, may represent only a pixel/pixel value of a luma component, or may represent only a pixel/pixel value of a chroma component. A sample may be used as a term corresponding to a picture (or image) as a pixel or a pel.

The subtractor 10a-31 may generate a residual signal (a residual block, residual samples, or a residual sample array) by subtracting a predicted signal (a predicted block, predicted samples, or a predicted sample array) output from a predictor 10a-20 from an input video signal (an original block, original samples, or an original sample array), and the generated residual signal is transmitted to the transformer 10a-32. A predictor 10a-20 can perform prediction on a processing target block (hereinafter referred to as a current block) and generate a predicted block including predicted samples with respect to the current block. The predictor 10a-20 can determine whether intra-prediction or inter-prediction is applied to the current block or coding unit (CU). The predictor can generate various types of information about prediction, such as prediction mode information, and transmit the information to an entropy encoder 10a-40. Information about prediction can be encoded in the entropy encoder 10a-40 and output in the form of a bitstream.

The intra predictor 10a-22 can predict a current block with reference to samples in a current picture. Referred samples may, spatially and/or temporally, neighbor (i.e. be adjacent to) the current block or may be separated therefrom according to a prediction mode. In intra-prediction, prediction modes may include a plurality of nondirectional modes and a plurality of directional modes. The nondirectional modes may include a DC mode and a planar mode, for example. The directional modes may include, for example, 33 directional prediction modes or 65 directional prediction modes according to a degree of minuteness of prediction direction. However, this is an example, and a higher or lower number of directional prediction modes may be used depending on the setting. The intra predictor 10a-22 may determine a prediction mode to be applied to the current block using a prediction mode applied to neighbor blocks.

The inter predictor 10a-21 can derive a predicted block with respect to the current block on the basis of a reference block (reference sample array) specified by a motion vector on a reference picture. Here, to reduce the quantity of motion information transmitted in an inter-prediction mode, motion information can be predicted in units of blocks, subblocks, or sample on the basis of correlation of motion information between a neighboring block and the current block. The motion information may include a motion vector and a reference picture index. The motion information may further include inter-prediction direction (L0 prediction, L1 prediction, Bi prediction, etc.) information. In the case of inter-prediction, neighboring blocks may include a spatial neighboring block present in a current picture and a temporal neighboring block present in a reference picture. The reference picture including the reference block may be the same as or different from the reference picture including the temporal neighboring block. The temporal neighboring block may be called a collocated reference block or a collocated CU (colCU) and the reference picture including the temporal neighboring block may be called a collocated picture (colPic). For example, the inter predictor 10a-21 may form a motion information candidate list on the basis of neighboring blocks and generate information indicating which candidate is used to derive a motion vector and/or a reference picture index of the current block. Inter-prediction can be performed on the basis of various prediction modes, and in the case of a skip mode and a merge mode, the inter predictor 10a-21 can use motion information of a neighboring block as motion information of the current block. In the case of the skip mode, a residual signal may not be transmitted differently from the merge mode. In the case of a motion vector prediction (MVP) mode, the motion vector of the current block can be indicated by using a motion vector of a neighboring block as a motion vector predictor and signaling a motion vector difference.

The predictor 10a-20 may generate a prediction signal based on various prediction methods to be described later. For example, the predictor may apply intra prediction or inter prediction to predict one block, and may simultaneously apply both intra prediction and inter prediction. This can be called combined inter and intra prediction (CIIP). In addition, the predictor may perform intra block copy (IBC) to predict the block. IBC may be used for video/video coding of content such as a game, for example, screen content coding (SCC). IBC basically performs prediction within the current picture, but may be performed similarly to inter prediction in that a reference block is derived within the current picture. That is, IBC may use at least one of the inter prediction techniques described in the present disclosure.

A predicted signal generated through the inter predictor 10a-21 or the intra predictor 10a-22 can be used to generate a reconstructed signal or a residual signal. The transformer 10a-32 can generate transform coefficients by applying a transform technique to a residual signal. For example, the transform technique may include at least one of DCT (Discrete Cosine Transform), DST (Discrete Sine Transform), GBT (Graph-Based Transform), and CNT (Conditionally Non-linear Transform). Here, GBT refers to transform obtained from a graph representing information on relationship between pixels. CNT refers to transform obtained on the basis of a predicted signal generated using all previously reconstructed pixels. Further, the transform process may be applied to square pixel blocks having the same size or applied to non-square blocks having variable sizes.

A quantizer 10a-33 may quantize transform coefficients and transmit the quantized transform coefficients to the entropy encoding unit 10a-40, and the entropy encoding unit 10a-40 may encode a quantized signal (information about the quantized transform coefficients) and output the encoded signal as a bitstream. The information about the quantized transform coefficients may be called residual information. The quantizer 10a-33 may rearrange the quantized transform coefficients in the form of a block into the form of a one-dimensional vector on the basis of a coefficient scan order and may generate information about the quantized transform coefficients on the basis of the quantized transform coefficients in the form of a one-dimensional vector. The entropy encoding unit 10a-40 can execute various encoding methods such as exponential Golomb, context-adaptive variable length coding (CAVLC) and context-adaptive binary arithmetic coding (CABAC), for example.

The entropy encoding unit 10a-40 may encode information necessary for video/image reconstruction (e.g., values of syntax elements and the like) along with or separately from the quantized transform coefficients. Encoded information (e.g., video/image information) may be transmitted or stored in the form of a bitstream in network abstraction layer (NAL) unit. The video/image information may further include information about various parameter sets, such as an adaptation parameter set (APS), a picture parameter set (PPS), a sequence parameter set (SPS), or a video parameter set (VPS). In addition, the video/image information may further include general constraint information. Signaling/transmitted information and/or syntax elements described later in the present disclosure may be encoded through the above-described encoding procedure and included in the bitstream. The bitstream may be transmitted through a network or stored in a digital storage medium. Here, the network may include a broadcast network and/or a communication network and the digital storage medium may include various storage media such as a flash drive, SD card, CD, DVD, Blue-ray disc, HDD, or SSD. A transmitter (not shown) which transmits the signal output from the entropy encoding unit 10a-40 and/or a storage (not shown) which stores the signal may be configured as internal/external elements of the encoding apparatus 10a, and the transmitter may be included in the entropy encoding unit 10a-40.

The quantized transform coefficients output from the quantizer 10a-33 can be used to generate a predicted signal. For example, a residual signal can be reconstructed by applying inverse quantization and inverse transform to the quantized transform coefficients through a dequantizer 10a-34 and an inverse transformer 10a-35 in the loop. An adder 10a-50 can add the reconstructed residual signal to the predicted signal output from the inter predictor 10a-21 or the intra predictor 10a-22 such that a reconstructed signal (reconstructed picture, reconstructed block, or reconstructed sample array) can be generated. When there is no residual with respect to a processing target block as in a case in which the skip mode is applied, a predicted block can be used as a reconstructed block. The adder 10a-50 may also be called a reconstruction unit or a reconstructed block generator. The generated reconstructed signal can be used for intra-prediction of the next processing target block in the current picture or used for inter-prediction of the next picture through filtering which will be described later.

Meanwhile, luma mapping with chroma scaling (LMCS) may be applied during picture encoding and/or restoration.

The filter 10a-60 may improve subjective/objective image quality by applying filtering to the reconstructed signal. For example, the filter 10a-60 may generate a modified reconstructed picture by applying various filtering methods to the reconstructed picture, and store the modified reconstructed picture into the memory 10a-70, specifically the memory 10a-70 can be stored in the DPB. The various filtering methods may include, for example, deblocking filtering, sample adaptive offset (SAO), an adaptive loop filter, a bilateral filter, and the like. The filter 10a-60 may generate various kinds of filtering-related information and transmit it to the entropy encoding unit 10a-90, as will be described later in the description of each filtering method. The filtering-related information may be encoded by the entropy encoding unit 10a-90 and outputted in the form of a bitstream.

The modified reconstructed picture transmitted to the memory 10a-70 may be used as a reference picture in the inter predictor 10a-21. Through this, when inter prediction is applied, the encoding apparatus can avoid prediction mismatch between the encoding apparatus 10a and the decoding apparatus, and can also improve encoding efficiency.

The DPB of the memory 10a-70 may store the modified reconstructed picture to be used as a reference picture in the inter predictor 10a-21. The memory 10a-70 may store motion information of a block from which motion information in the current picture is derived (or encoded) and/or motion information of blocks in an already reconstructed picture. The stored motion information may be transmitted to the inter predictors 10a-21 to be used as motion information of a spatial neighboring block or motion information of a temporal neighboring block. The memories 10a-70 may store reconstructed samples of blocks reconstructed in the current picture, and may transmit the reconstructed samples to the intra predictors 10a-22.

Figure 3:
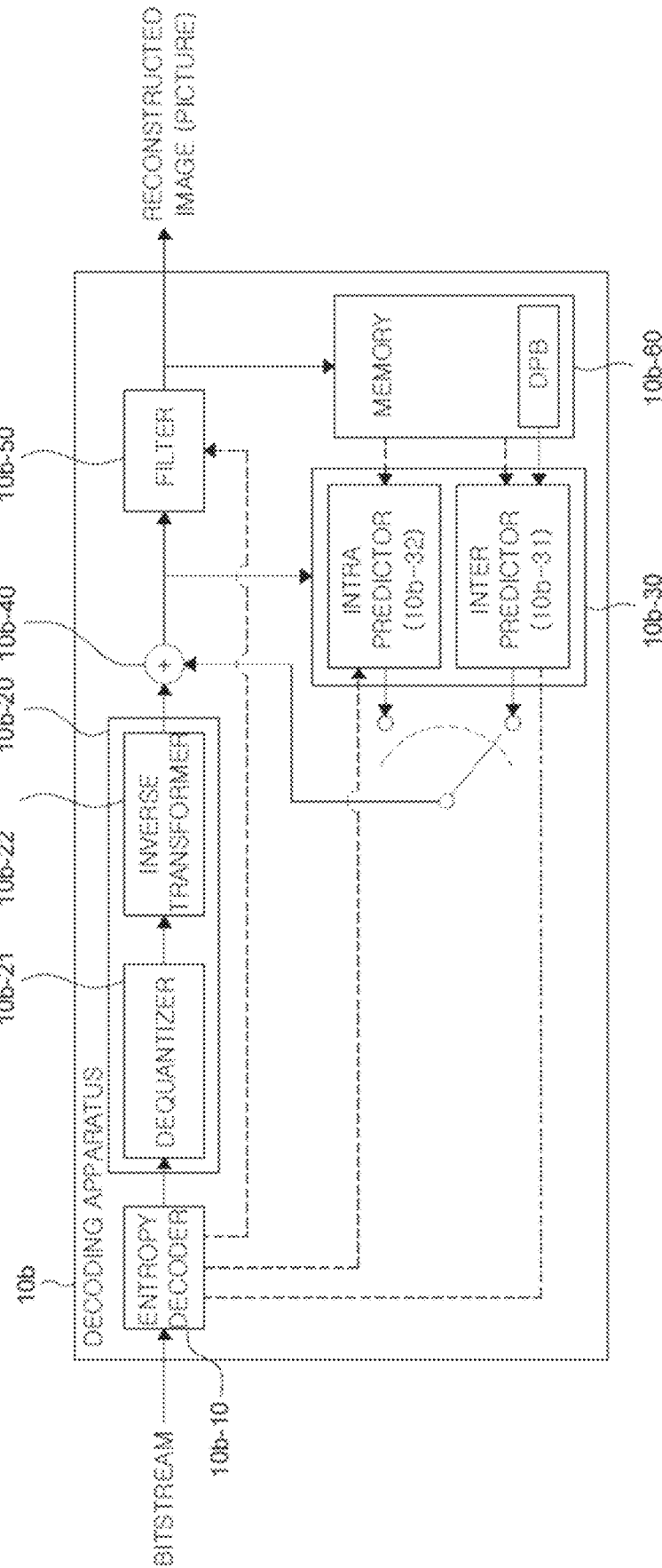
FIG. 3 is a schematic diagram of a video/image decoder.

FIG. 3 illustrates a configuration of a video/image decoder.

Referring to FIG. 3, the decoding apparatus 10b may be configured to include an entropy decoder 10b-10, a residual processor 10b-20, a predictor 10b-30, and an adder 10b-40, a filter 10b-50, and a memory 10b-60. The predictor 10b-30 may include an inter predictor 10b-31 and an intra predictor 10b-32. The residual processor 10b-20 may include a dequantizer 10b-21 and an inverse transformer 10b-22. The entropy decoder 10b-10, the residual processor 10b-20, the predictor 10b-30, the adder 10b-40, and the filter 10b-50 may be configured by one hardware component (e.g., a decoder chipset or a processor) according to an example. In addition, the memory 10b-60 may include a decoded picture buffer (DPB), and may be configured by a digital storage medium. The hardware component of the memory 10b-60 may be configured as an internal or external component.

When a bitstream including video/image information is input into the decoding apparatus 10b, the decoding apparatus 10b may reconstruct an image corresponding to a process in which the video/image information is processed in the encoding apparatus 10a of FIG. 2. For example, the decoding apparatus 10b may derive units/blocks based on block division related information obtained from the bitstream. The decoding apparatus 10b may perform decoding by using a processing unit applied in the encoding apparatus. Thus, the processing unit of decoding may be, for example, a coding unit, and the coding unit may be divided according to a quad tree structure, a binary tree structure, and/or a ternary tree structure from a coding tree unit or a largest coding unit. One or more transformers may be derived from a coding unit. In addition, the reconstructed image signal decoded and output through the decoding apparatus 10b may be reproduced through the playback device.

The decoding apparatus 10b may receive a signal output from the encoding apparatus 10a of FIG. 2 in the form of a bitstream, and the received signal may be decoded through the entropy decoder 10b-10. For example, the entropy decoder 10b-10 may parse the bitstream to derive information (e.g., video/image information) required for image restoration (or video restoration). The video/image information may further include information about various parameter sets, such as an adaptation parameter set (APS), a picture parameter set (PPS), a sequence parameter set (SPS), or a video parameter set (VPS). In addition, the video/image information may further include general constraint information.

The decoding apparatus may decode the picture further based on the information on the parameter set and/or the general restriction information. Signaling/received information and/or syntax elements, described later in the present disclosure, may be decoded through the decoding procedure and obtained from the bitstream. For example, the entropy decoder 10b-10 may decode information in the bitstream on the basis of a coding method such as exponential Golomb, CAVLC, or CABAC and may output syntax element values necessary for image reconstruction and quantized values of transform coefficients with respect to residual. More specifically, the CABAC entropy decoding method receives a bin corresponding to each syntax element in the bitstream, determines a context model using decoding target syntax element information and decoding information of neighboring and decoding target blocks or information on symbols/bins decoded in a previous stage, predicts bin generation probability according to the determined context model and performs arithmetic decoding of bins to generate a symbol corresponding to each syntax element value. In this case, the CABAC entropy decoding method may update the context model by using the decoded symbol/bin information for the context model of the next symbol/bin after determining the context model. Information about prediction among the information decoded by the entropy decoder 10b-10 is provided to the predictor 10b-30, and information about the residual on which entropy decoding is provided by the entropy decoder 10b-10. That is, the quantized transform coefficients and related parameter information may be input to the dequantizer 10b-21.

Also, information on filtering among the information decoded by the entropy decoder 10b-10 may be provided to the filter 10b-50. On the other hand, a receiver (not shown) that receives a signal output from the encoding apparatus may be further configured as an internal/external element of the decoding apparatus 10b, or the receiver may be a component of the entropy decoder 10b-10. On the other hand, the decoding apparatus according to the present disclosure may be referred to as a video/image/picture decoding apparatus, and the decoding apparatus may be divided into an information decoder (video/image/picture information decoder) and a sample decoder (video/image/picture sample decoder). The information decoder may include the entropy decoder 10b-10, and the sample decoder may include at least one of the dequantizer 10b-21, the inverse transformer 10b-22, the predictor 10b-30, the adder 10b-40, the filter 10b-50, and the memory 10b-60.

The dequantizer 10b-21 may inverse quantize the quantized transform coefficients to output the transform coefficients. The dequantizer 10b-21 may rearrange the quantized transform coefficients in a two-dimensional block form. In this case, the rearrangement may be performed based on the coefficient scan order performed by the encoding device. The dequantizer 10b-21 may perform inverse quantization on the quantized transform coefficients using a quantization parameter (e.g., quantization step size information) and obtain transform coefficients. The dequantizer 10b-21 may perform inverse quantization on the quantized transform coefficients using a quantization parameter (e.g., quantization step size information) and obtain transform coefficients.

The inverse transformer 10b-22 inverse transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the prediction information output from the entropy decoder 10b-10, and may determine a specific intra/inter prediction mode.

The predictor may generate a prediction signal based on various prediction methods to be described later. For example, the predictor may apply intra prediction or inter prediction to predict one block, and may simultaneously apply both intra prediction and inter prediction. This can be referred to as combined inter and intra prediction (CIIP). In addition, the predictor may perform intra block copy (IBC) to predict the block. IBC may be used for video/video coding of content such as a game, for example, screen content coding (SCC). IBC basically performs prediction within the current picture, but may be performed similarly to inter prediction in that a reference block is derived within the current picture. That is, IBC may use at least one of the inter prediction techniques described in the present disclosure.

The intra predictor 10b-32 may predict the current block with reference to samples in the current picture. The referenced samples may be located in the vicinity of the current block or may be located apart from each other according to the prediction mode. In intra prediction, prediction modes may include a plurality of non-directional modes and a plurality of directional modes. The intra predictor 10b-32 may determine the prediction mode applied to the current block by using the prediction mode applied to the neighboring block.

The inter predictor 10b-31 may derive the predicted block for the current block based on the reference block (reference sample array) specified by the motion vector on the reference picture. In this case, in order to reduce the amount of motion information transmitted in the inter prediction mode, the motion information may be predicted in units of blocks, subblocks, or samples based on the correlation between motion information between neighboring blocks and the current block. The motion information may include a motion vector and a reference picture index. The motion information may further include inter prediction direction (L0 prediction, L1 prediction, Bi prediction, and the like) information.

In the case of inter prediction, the neighboring blocks may include spatial neighboring blocks existing in the current picture and temporal neighboring blocks present in the reference picture. For example, the inter predictor 10b-31 may construct a motion information candidate list based on neighboring blocks, and derive a motion vector and/or a reference picture index of the current block based on the received candidate selection information. Inter prediction may be performed based on various prediction modes, and the information on the prediction may include information indicating the mode of inter prediction for the current block.

The adder 10b-40 may generate a reconstructed signal (reconstructed picture, reconstructed block, or reconstructed sample array) by adding the obtained residual signal to the predicted signal (predicted block or predicted sample array) output from the predictor 10b-30. When there is no residual with respect to the processing target block as in a case in which the skip mode is applied, the predicted block may be used as a reconstructed block.

The adder 10b-40 may be referred to as a restoration unit or a restoration block generation unit. The generated reconstructed signal may be used for intra prediction of the next processing object block in the current picture, may be output through filtering as described below, or may be used for inter prediction of the next picture.

Meanwhile, luma mapping with chroma scaling (LMCS) may be applied in the picture decoding process.

The filter 10b-50 can improve subjective/objective picture quality by applying filtering to the reconstructed signal. For example, the filter 10b-50 can generate a modified reconstructed picture by applying various filtering methods to the reconstructed picture and transmit the modified reconstructed picture to a memory 60, specifically to the DPB. The various filtering methods may include, for example, deblocking filtering, sample adaptive offset, adaptive loop filter, and bilateral filter.

The (modified) reconstructed picture stored in the DPB of the memory 10b-60 may be used as a reference picture in the inter predictor 10b-31. The memory 10b-60 may store motion information of a block in which motion information in the current picture is derived (or decoded) and/or motion information of blocks in an already reconstructed picture. The stored motion information may be transmitted to the inter predictor 10b-31 to be used as motion information of a spatial neighboring block or motion information of a temporal neighboring block. The memory 10b-60 may store reconstructed samples of blocks reconstructed in the current picture, and may transmit the reconstructed samples to the intra predictor 10b-32.

In the present disclosure, examples described in the predictor 10b-30, the dequantizer 10b-21, the inverse transformer 10b-22, and the filter 10b-50 of the decoding apparatus 10b may be applied to be the same or corresponding to the predictor 10a-20, the dequantizer 10a-34, the inverse transformer 10a-35, and the filter 10a-60 of the encoding apparatus 10a, respectively.

As described above, in video coding, prediction is performed to increase compression efficiency. Through this, it is possible to generate a predicted block including prediction samples for the current block, which is a block to be coded. Here, the predicted block includes prediction samples in a spatial domain (or pixel domain). The predicted block is derived identically in the encoding device and the decoding apparatus. The encoding apparatus may increase image coding efficiency by signaling, to the decoding apparatus, information (residual information) about the residual between the original block and the predicted block, rather than the original sample value of the original block itself. The decoding apparatus may derive a residual block including residual samples based on the residual information, may generate a reconstructed block including reconstructed samples by adding the residual block and the predicted block, and may generate a reconstructed picture including the reconstructed blocks.

The residual information may be generated through transformation and quantization procedures. For example, the encoding apparatus derives a residual block between the original block and the predicted block, and performs a transform procedure on residual samples (residual sample array) included in the residual block to derive transform coefficients, and by performing a quantization procedure on the transform coefficients to derive quantized transform coefficients, the associated residual information may be signaled to the decoding apparatus (via a bitstream). Here, the residual information may include value information of the quantized transform coefficients, location information, a transform technique, a transform kernel, and information such as a quantization parameter. The decoding apparatus may perform an inverse quantization/inverse transformation procedure based on the residual information and derive residual samples (or residual blocks). The decoding apparatus may generate a reconstructed picture based on the predicted block and the residual block. The encoding apparatus may also inverse quantize/inverse transform the quantized transform coefficients for reference for inter prediction of a later picture to derive a residual block, and generate a reconstructed picture based thereon.

Scalable Video Coding

Scalable video coding (SVC) refers to a complex bitstream video that includes several types of images in one bitstream, and may provide video services in various networks and heterogeneous terminal environments by compressing several types of images into one complex bitstream.

SVC may be transformed into scalable feature coding (SFC) for a machine task. The SFC may generate a complex bitstream feature map including several types of feature maps in one bitstream. As described above, by compressing various types of feature maps into one complex bit stream, a machine analysis service can be provided in various networks and heterogeneous terminal environments.

SFC is a technology that allows a decoding apparatus to selectively decode a part of a bitstream. The encoded bitstream may include a base layer and at least one enhancement layer. The base layer and at least one enhancement layer may be arranged in a specific order within the encoded bitstream.

However, the present disclosure is not limited to the enhancement layer, and the enhancement layer may be referred to as various layers such as an extension layer, an additional layer, and a lower layer.

SVC or SFC includes various scalable encoding modes. For example, a mode for spatial scalability provides layers of spatial resolution, and a mode for temporal scalability provides layers of frame rate. In addition, quality scalability, complexity scalability, and the like provide a layer for the visual quality of an image or a feature quality of a feature map and a layer for the complexity of the decoding method.

In the mode for spatial scalability, the base layer of an image or feature map contains encoded frames of reduced resolution. When only the base layer is decoded, a low-resolution output image and/or feature map can be obtained. When one or more enhancement layers are decoded together with the base layer, a high-resolution output image and/or feature map can be obtained.

In the mode for temporal scalability, the base layer is encoded with a low video or feature map frame rate. Although the frame rate is low when only the base layer is decoded, the frame rate can be increased by decoding the base layer and at least one enhancement layer together. The enhancement layer may include I-VOP encoded without prediction, P-VOP predicted from VOP of a previous layer and subsequent base layer VOP, and B-VOP predicted from VOP of previous and subsequent layers.

An input signal used for SVC or SFC may have a different resolution, frame rate, bit-depth, color format, aspect ratio, and the like between layers as described above. Accordingly, by performing prediction between layers in consideration of this point, it is possible to reduce redundancy and increase encoding performance compared to simulcast.

Various inter-layer prediction methods may be used. In order to reduce the amount of information about the encoder, the predictor, and the transformer transmitted in the enhancement layer, prediction of the encoder/predictor/transformer between layers may be performed.

Figure 4:
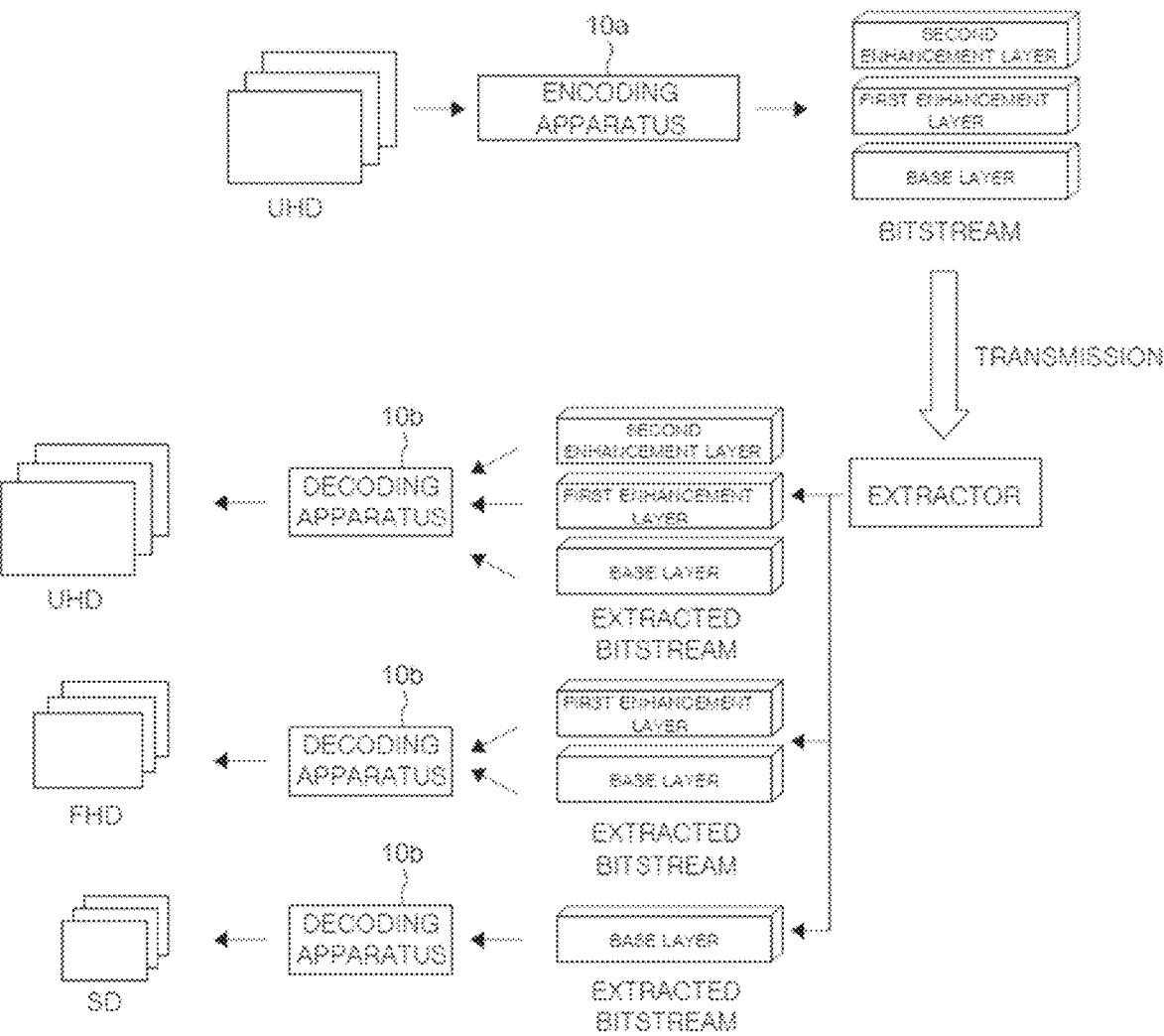
FIG. 4 is a schematic diagram of an encoding and decoding process using SVC (Support Video Coding).

FIG. 4 illustrates an encoding and decoding process using SVC.

Referring to FIG. 4, the encoding apparatus 10*a* may perform SVC encoding or SFC encoding on an original video (e.g., UHD video), so that the video or feature map stream of several layers may be divided and transmitted. The various layers may include, for example, a base layer, a first enhancement layer, and a second enhancement layer as illustrated.

The base layer may be for an image of a basic resolution (e.g., SD resolution) as described later, and the first enhancement layer may include information not included in the base layer for an image of a first resolution (e.g., FHD resolution). The second enhancement layer may include information not included in the base layer and the first enhancement layer for an image of a second resolution (e.g., UHD resolution).

The base layer may be for a feature map of a base resolution (e.g., a minimum feature map resolution such as 224×224×3) as described later, the first enhancement layer may include information not included in the base layer for the feature map of the first resolution (e.g., 512×512×3 resolution). The second enhancement layer may include information not included in the first base layer and the second enhancement layer for a second resolution (e.g., a 720×720×3 feature map).

A video stream including the base layer, the first enhancement layer, and the second enhancement layer may be transmitted.

The extractor extracts the base layer and one or more enhancement layers from the received bitstream, and transmits them to the decoding apparatus 10*b*.

When the decoding apparatus 10*b* decodes only the base layer, a low-resolution output image may be obtained. However, if the decoding device 10*b* decodes one or more enhancement layers together with the base layer, a high-resolution output image may be obtained.

Neural Processing Unit

Figure 5:
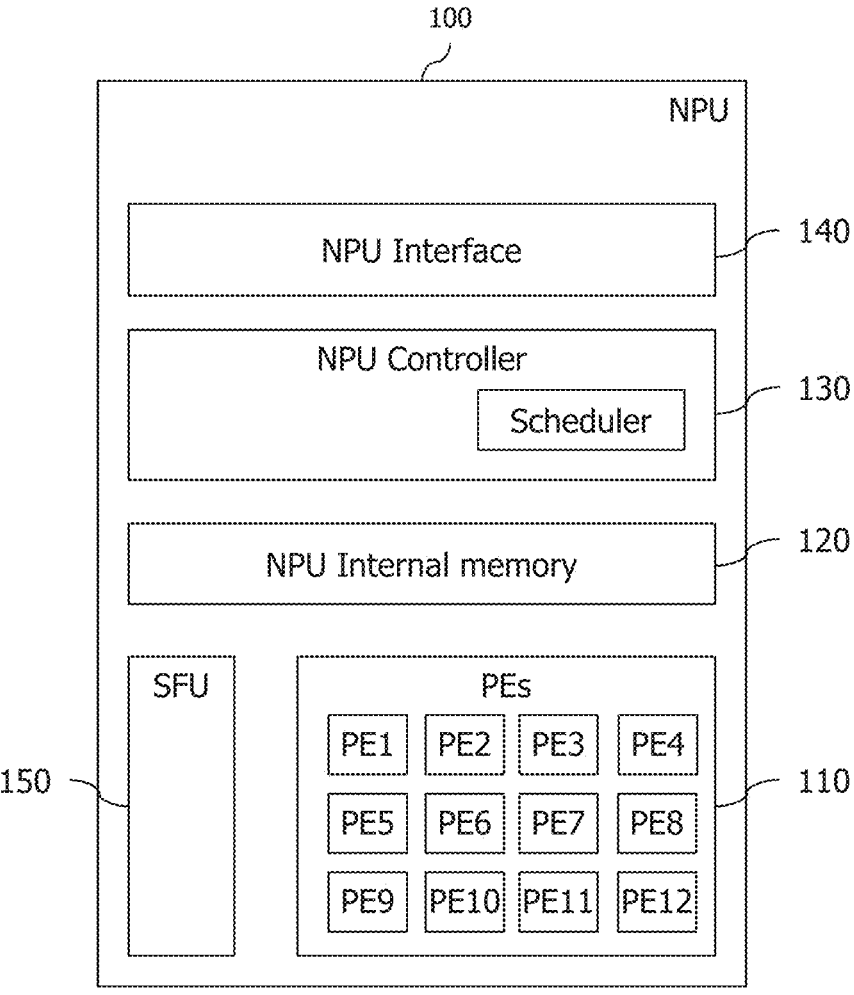
FIG. 5 is a schematic conceptual diagram illustrating a neural processing unit according to the present disclosure.

FIG. 5 illustrates a neural processing unit according to the present disclosure.

Referring to FIG. 5, a neural processing unit (NPU) 100 is a processor specialized to perform operations of an artificial neural network.

The artificial neural network refers to a network in which a set of artificial neurons are collectively trained in a way that a number of various inputs or entry stimulations are taken in, multiply them by a weight, add up the multiplied values, and convert a value obtained by additionally adding a deviation using an active function to transmit. The artificial neural network trained as described above may be used to output an inference result from input data.

The NPU 100 may be a semiconductor device implemented by an electric/electronic circuit. The electric/electronic circuit may refer to a circuit including a large number of electronic elements (transistors, capacitors, and the like).

In the case of a transformer and/or CNN-based artificial neural network model, the NPU 100 may select and process matrix multiplication operations, convolution operations, and the like according to the architecture of the artificial neural network. Hereinafter, an artificial neural network model based on a Transformer and/or a CNN will be referred to as an ANN for convenience of description.

For example, in each layer of the ANN, a parameter corresponding to input data, for example, a kernel (i.e., weight) corresponding to an input feature map can be referred to as a Tensor composed of a plurality of channels, matrix, and the like. For example, a convolution operation between an input feature map and a kernel is performed, and a convolution operation and a pooled output feature map may be generated in each channel. An activation map of a corresponding channel may be generated by applying an activation function to an output feature map. After that, pooling for the activation map may be applied. Here, the activation map may be generically referred to as an output feature map.

However, examples of the present disclosure are not limited thereto, and the output feature map may mean that a matrix multiplication operation or a convolution operation is applied.

To elaborate, the output feature map according to the examples of the present disclosure should be interpreted in a comprehensive sense. For example, the output feature map may be a result of a matrix multiplication operation or a convolution operation. Accordingly, the plurality of processing elements 110 may be modified to further include processing circuitry for additional algorithms.

The NPU 100 may be configured to include a plurality of processing elements 110 for processing convolution and matrix multiplication required for the above-described artificial neural network operation.

The NPU 100 may be configured to include each processing circuitry optimized for matrix-multiplication operation, convolution operation, activation function operation, pooling operation, stride operation, batch-normalization operation, skip-connection operation, concatenation operation, quantization operation, clipping operation, and padding operation necessary for the above-described artificial neural network operation.

For example, the NPU 100 may be configured to include the SFU 150 for processing at least one of the algorithms among activation function operation, pooling operation, stride operation, batch-normalization operation, skip-connection operation, concatenation operation, quantization operation, clipping operation, padding operation as described above.

Specifically, the NPU 100 may include a plurality of processing elements (PE) 110, an SFU 150, an NPU internal memory 120, an NPU controller 130, and an NPU interface 140. Each of the plurality of processing elements 110, SFU 150, NPU internal memory 120, NPU controller 130, and NPU interface 140 may be formed of a semiconductor circuitry in which numerous transistors are connected. Accordingly, some of them may be difficult to discern and distinguish with the naked eyes, and may only be identified by specialized devices or circuits.

For example, an arbitrary circuit may operate as a plurality of processing elements 110 or as an NPU controller 130. The NPU controller 130 may be configured to perform the function of a controller configured to control an artificial neural network inference operation of the NPU 100

The NPU 100 may include an NPU internal memory 120 configured to store parameters of an artificial neural network model that can be inferred from the plurality of processing elements 110 and the SFU 150 and an NPU controller 130 including a scheduler configured to control an operation schedule of the plurality of processing elements 110, the SFU 150, and the NPU internal memory 120.

The NPU 100 may be configured to process feature maps corresponding to encoding and decoding schemes using SVC or SFC.

The plurality of processing elements 110 may perform part of an operation to perform an inference using an artificial neural network.

SFU 150 may perform another portion of the operation for the artificial neural network.

The NPU 100 may be configured to hardware-accelerate the computation of the artificial neural network model using the plurality of processing elements 110 and the SFU 150.

The NPU interface 140 may communicate with various components connected to the NPU 100 through a system bus, for example, a memory.

The NPU controller 130 may include a scheduler configured to control an operation of a plurality of processing elements 110 for inference operation of the neural processing unit 100, an operation of the SFU 150, and a reading and writing order of the NPU internal memory 120.

The scheduler in the NPU controller 130 may be configured to control the plurality of processing elements 110, the SFU 150, and the NPU internal memory 120 based on data locality information or structure information of the artificial neural network model.

The scheduler in the NPU controller 130 may analyze the structure of the artificial neural network model to operate in the plurality of processing elements 110 and the SFU 150 or may be provided with previously analyzed information. For example, data of an artificial neural network that can be included in an artificial neural network model may include at least a portion of node data of each layer (i.e., feature map), arrangement data of layers, locality information or structure information, and weight data of each network connecting the nodes of each layer (i.e., weight kernel). Data of the artificial neural network may be stored in memory provided inside the NPU controller 130 or in the NPU internal memory 120.

The scheduler in the NPU controller 130 may schedule an operation order of the artificial neural network model to be performed by the NPU 100 based on data locality information or structure information of the artificial neural network model.

The scheduler in the NPU controller 130 may obtain a memory address value in which a feature map and weight data of a layer of an artificial neural network model are stored based on data locality information or structure information of the artificial neural network model. For example, the scheduler in the NPU controller 130 may obtain a memory address value at which a feature map and weight data of a layer of an artificial neural network model stored in a memory are stored. Therefore, the scheduler in the NPU controller 130 may retrieve the feature map and weight data of the layer of the artificial neural network model to be driven from the main memory and store them in the NPU internal memory 120.

A feature map of each layer may have a corresponding memory address value.

Each weight data may have a corresponding memory address value.

The scheduler in the NPU controller 130 may schedule the operation order of the plurality of processing elements 110 based on the data locality information or structure information of an artificial neural network model, for example, arrangement data of artificial neural network layers of an artificial neural network model, locality information, or information about a structure.

Moreover, the NPU scheduler in the NPU controller 130 may operate the NPU 100 according to the determined processing order based on the data locality information or the information about the structure of the artificial neural network model and/or data locality information or information about a structure of the NPU 100 to be used.

However, the present disclosure is not limited to the data locality information or the information about the structure of the NPU 100.

The NPU scheduler in the NPU controller 130 may be configured to store the data locality information or the information about the structure of the artificial neural network.

That is, even though only the data locality information or the information about the structure of the artificial neural network of the artificial neural network model is utilized, the NPU scheduler in the NPU controller 130 may determine a processing sequence.

Moreover, the NPU scheduler in the NPU controller 130 may determine the processing order of the NPU 100 by considering the data locality information or the information about the structure of the artificial neural network model and data locality information or information about a structure of the NPU 100. Furthermore, optimization of the processing is possible according to the determined processing order.

The plurality of processing elements 110 refers to a configuration in which a plurality of processing elements PE1 to PE12 configured to operate feature map and weight data of the artificial neural network is disposed. Each processing element may include a multiply and accumulate (MAC) operator and/or an arithmetic logic unit (ALU) operator, but the examples according to the present disclosure are not limited thereto.

Each processing element may be configured to optionally further include an additional special function unit for processing the additional special function.

For example, it is also possible for the processing element PE to be modified and implemented to further include a batch-normalization unit, an activation function unit, an interpolation unit, and the like.

The SFU 150 may include a circuit configured to select and process operations such as activation function operation, pooling operation, stride operation, batch-normalization operation, skip-connection operation, concatenation operation, quantization operation, clipping operation, padding operation, and the like according to the architecture of an artificial neural network. That is, the SFU 150 may include a plurality of special function arithmetic processing circuit units.

Even though FIG. 5 illustrates a plurality of processing elements as an example, operators implemented by a plurality of multiplier and adder trees may also be configured to be deployed in parallel in one processing element, instead of the MAC. In this case, the plurality of processing elements 110 may also be referred to as at least one processing element including a plurality of operators.

The plurality of processing elements 110 is configured to include a plurality of processing elements PE1 to PE12. The plurality of processing elements PE1 to PE12 of FIG. 5 is just an example for the convenience of description and the number of the plurality of processing elements PE1 to PE12 is not limited to 12 or any other integer number. A size or the number of processing element arrays 110 may be determined by the number of the plurality of processing elements PE1 to PE12. The size of the plurality of processing elements 110 may be implemented by an N×M matrix. Here, N and M are integers greater than zero. The plurality of processing elements 110 may include N×M processing elements. That is, one or more processing elements may be provided.

A size of the plurality of processing elements 110 may be designed in consideration of the characteristics of the artificial neural network model in which the NPU 100 operates.

The plurality of processing elements 110 is configured to perform a function such as addition, multiplication, and accumulation required for the artificial neural network operation. In other words, the plurality of processing elements 110 may be configured to perform a multiplication and accumulation (MAC) operation.

Hereinafter, a first processing element PE1 among the plurality of processing elements 110 will be explained with an example.

Figure 6A:
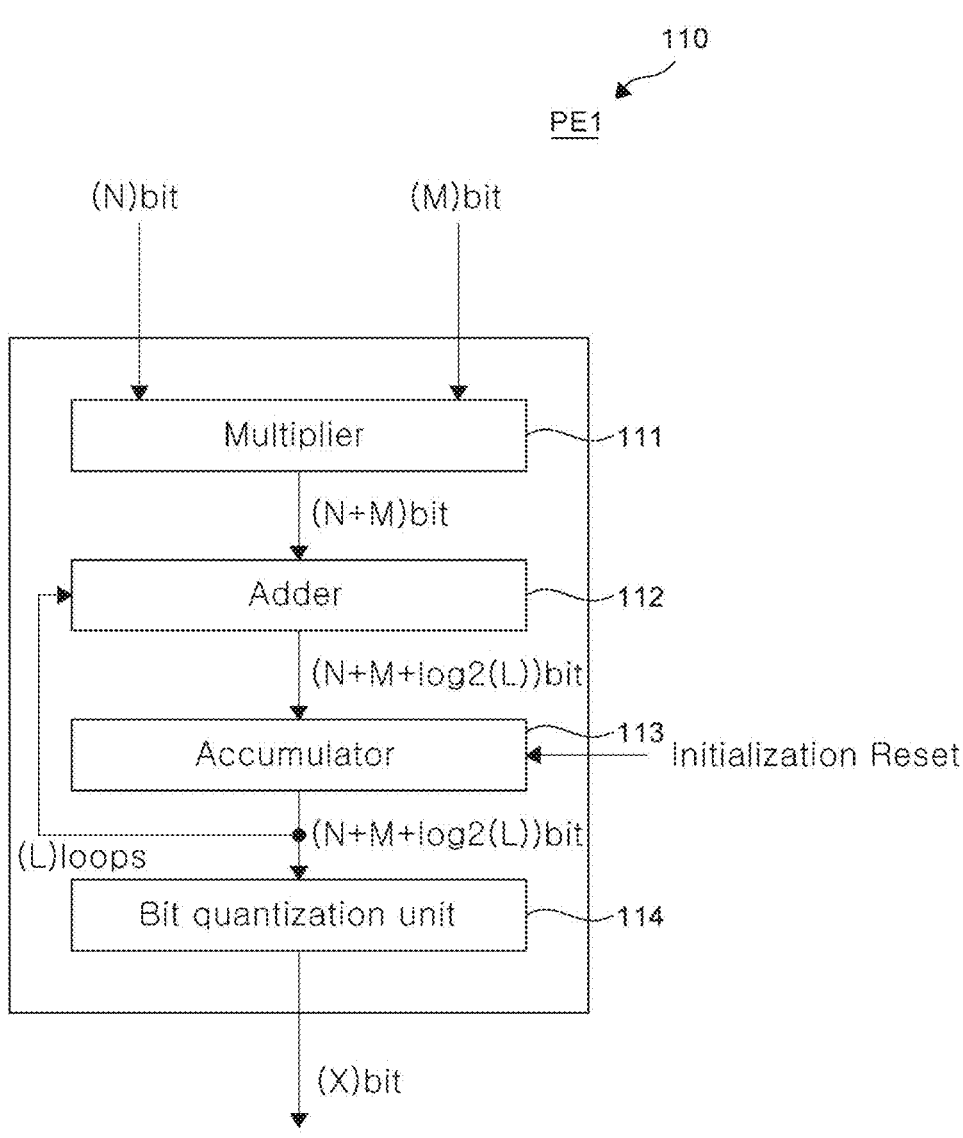
FIG. 6A is a schematic conceptual diagram illustrating one processing element among a plurality of processing elements that may be applied to the present disclosure.

FIG. 6A illustrates one processing element among a plurality of processing elements that may be applied to the present disclosure.

The NPU 100 according to the examples of the present disclosure may include the plurality of processing elements 110, the NPU internal memory 120 configured to store an artificial neural network model inferred from the plurality of processing elements 110, and the NPU scheduler 130 configured to control the plurality of processing elements 110 and the NPU internal memory 120 based on data locality information or information about a structure of the artificial neural network model. The plurality of processing elements 110 is configured to perform the MAC operation and the plurality of processing elements 110 is configured to quantize and output the MAC operation result, but the examples of the present disclosure are not limited thereto.

The NPU internal memory 120 may store all or a part of the artificial neural network model in accordance with the memory size and the data size of the artificial neural network model.

The first processing element PE1 may include a multiplier 111, an adder 112, an accumulator 113, and a bit quantizer 114. However, the examples according to the present disclosure are not limited thereto and the plurality of processing elements 110 may be modified in consideration of the operation characteristics of the artificial neural network.

The multiplier 111 multiplies input (N) bit data and (M) bit data. The operation value of the multiplier 111 is output as (N+M) bit data.

The multiplier 111 may be configured to receive one variable and one constant.

The accumulator 113 accumulates an operation value of the multiplier 111 and an operation value of the accumulator 113 using the adder 112 as many times as the number of (L) loops. Therefore, a bit width of data of an output unit and an input unit of the accumulator 113 may be output to (N+M+ $\log 2(L)$) bits. Here, L is an integer greater than zero.

When the accumulation is completed, the accumulator 113 is applied with an initialization reset to initialize the data stored in the accumulator 113 to zero, but the examples according to the present disclosure are not limited thereto.

The bit quantizer 114 may reduce the bit width of the data output from the accumulator 113. The bit quantizer 114 may be controlled by the NPU scheduler 130. The bit width of the quantized data may be output to (X) bits. Here, X is an integer greater than zero. According to the above-described configuration, the plurality of processing elements 110 is configured to perform the MAC operation and the plurality of processing elements 110 may quantize the MAC operation result to output the result. The quantization may have an effect that the larger the (L) loops, the smaller the power consumption, which leads to reduced heat generation. Consequently, the possibility of the erroneous operation of the NPU 100 due to the high temperature may be reduced.

Output data (X) bits of the bit quantizer 114 may serve as node data of a subsequent layer or input data of a convolution. When the artificial neural network model is quantized, the bit quantizer 114 may be configured to be supplied with quantized information from the artificial neural network model. However, it is not limited thereto and the NPU scheduler 130 may also be configured to extract quantized information by analyzing the artificial neural network model. Accordingly, the output data (X) bit is converted to a quantized bit width to be output so as to correspond to the quantized data size. The output data (X) bit of the bit quantizer 114 may be stored in the NPU internal memory 120 with a quantized bit width.

The plurality of processing elements 110 of the NPU 100 according to an example of the present disclosure may include a multiplier 111, an adder 112, and an accumulator 113. The bit quantizer 114 may be selected according to whether quantization is applied or not.

Figure 6B:
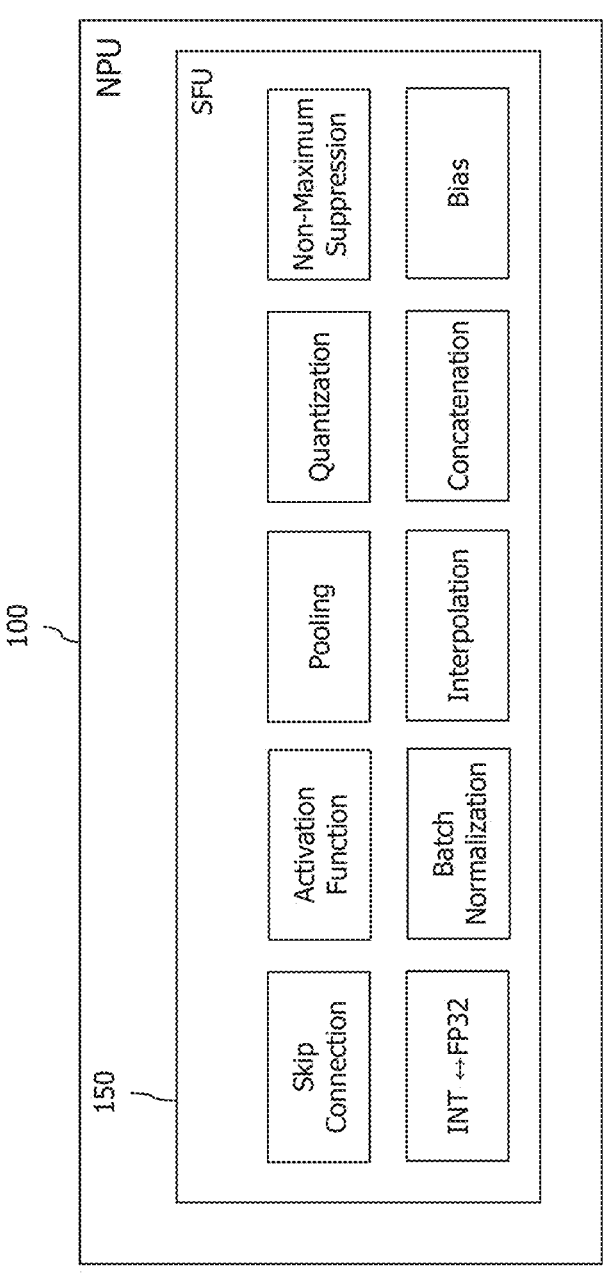
FIG. 6B is a schematic conceptual diagram illustrating an SFU (Special Function Unit) that can be applied to the present disclosure.

FIG. 6B is a schematic conceptual diagram illustrating an SFU that can be applied to the present disclosure.

Referring to FIG. 6B, the SFU 150 may include several functional units. Each functional unit can be operated selectively. Each functional unit can be selectively turned on or turned off. That is, each functional unit can be selected.

In other words, the SFU 150 may include various circuit units required to perform an inference using an artificial neural network inference operation.

For example, the circuit units of the SFU 150 may include a functional unit for skip-connection operation, a functional unit for activation function operation, a functional unit for pooling operation, a functional unit for quantization operation, a functional unit for non-maximum suppression (NMS) operation, a functional unit for integer to floating point conversion (INT to FP32) operation, a functional unit for a batch-normalization operation, a functional unit for an interpolation operation, a functional unit for a concatenation operation, a functional unit for a bias operation, and the like.

Functional units of the SFU 150 may be selectively turned on or off according to the data locality information of the artificial neural network model. Data locality information of an artificial neural network model may include turn-off of a corresponding functional unit or control information related to turn-off when an operation for a specific layer is performed.

An activated unit among functional units of the SFU 150 may be turned on. In this way, when some functional units of the SFU 150 are selectively turned off, power consumption of the NPU 100 can be reduced. Meanwhile, in order to turn off some functional units, power gating may be used. Alternatively, clock gating may be performed to turn off some functional units.

Figure 7:
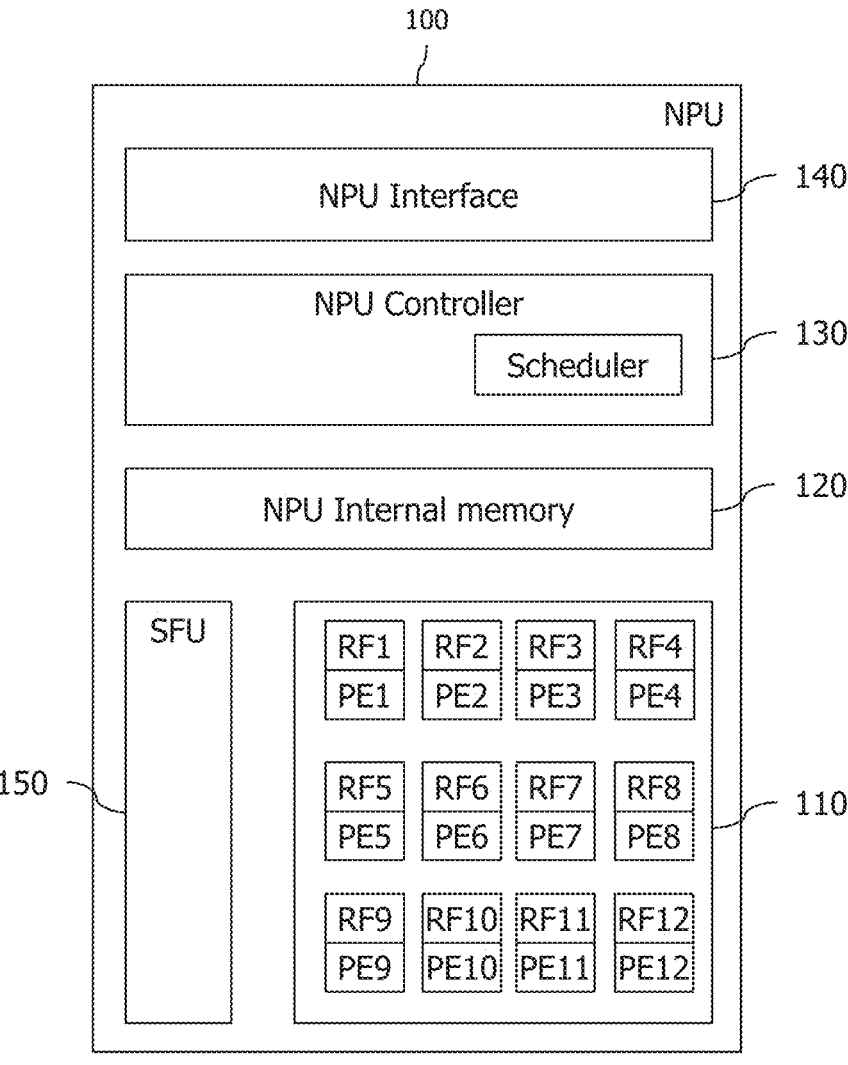
FIG. 7 is a schematic conceptual diagram illustrating a modified example of the neural processing unit of FIG. 5.

FIG. 7 illustrates a modified example of the neural processing unit 100 of FIG. 5.

The NPU 100 of FIG. 7 is substantially the same as the NPU 100 exemplarily illustrated in FIG. 5, except for the plurality of processing elements 110. Thus, in describing FIG. 7, the description of the elements shown in FIG. 5 will be omitted for brevity.

The plurality of processing elements 110 schematically illustrated in FIG. 7 may further include register files RF1 to RF12 corresponding to processing elements PE1 to PE12 in addition to a plurality of processing elements PE1 to PE12.

The plurality of processing elements PE1 to PE12 and the plurality of register files RF1 to RF12 of FIG. 7 are just an example for the convenience of description and the number of the plurality of processing elements PE1 to PE12 and the plurality of register files RF1 to RF12 is not limited to 12 or any other integer number.

A size of, or the number of, processing element arrays 110 may be determined by the number of the plurality of processing elements PE1 to PE12 and the plurality of register files RF1 to RF12. The size of the plurality of processing elements 110 and the plurality of register files RF1 to RF12 may be implemented by an N×M matrix. Here, N and M are integers greater than zero.

An array size of the plurality of processing elements 110 may be designed in consideration of the characteristic of the artificial neural network model in which the NPU 100 operates. For example, the memory size of the register file may be determined in consideration of a data size, a required operating speed, and a required power consumption of the artificial neural network model to operate.

The register files RF1 to RF12 of the NPU 100 are static memory units which are directly connected to the processing elements PE1 to PE12. For example, the register files RF1 to RF12 may be configured by flip-flops and/or latches. The register files RF1 to RF12 may be configured to store the MAC operation value of the corresponding processing elements PE1 to PE12. The register files RF1 to RF12 may be configured to provide or be provided with the weight data and/or node data to or from the NPU internal memory 120.

It is also possible that the register files RF1 to RF12 are configured to perform a function of a temporary memory of the accumulator during MAC operation.

Figure 8:
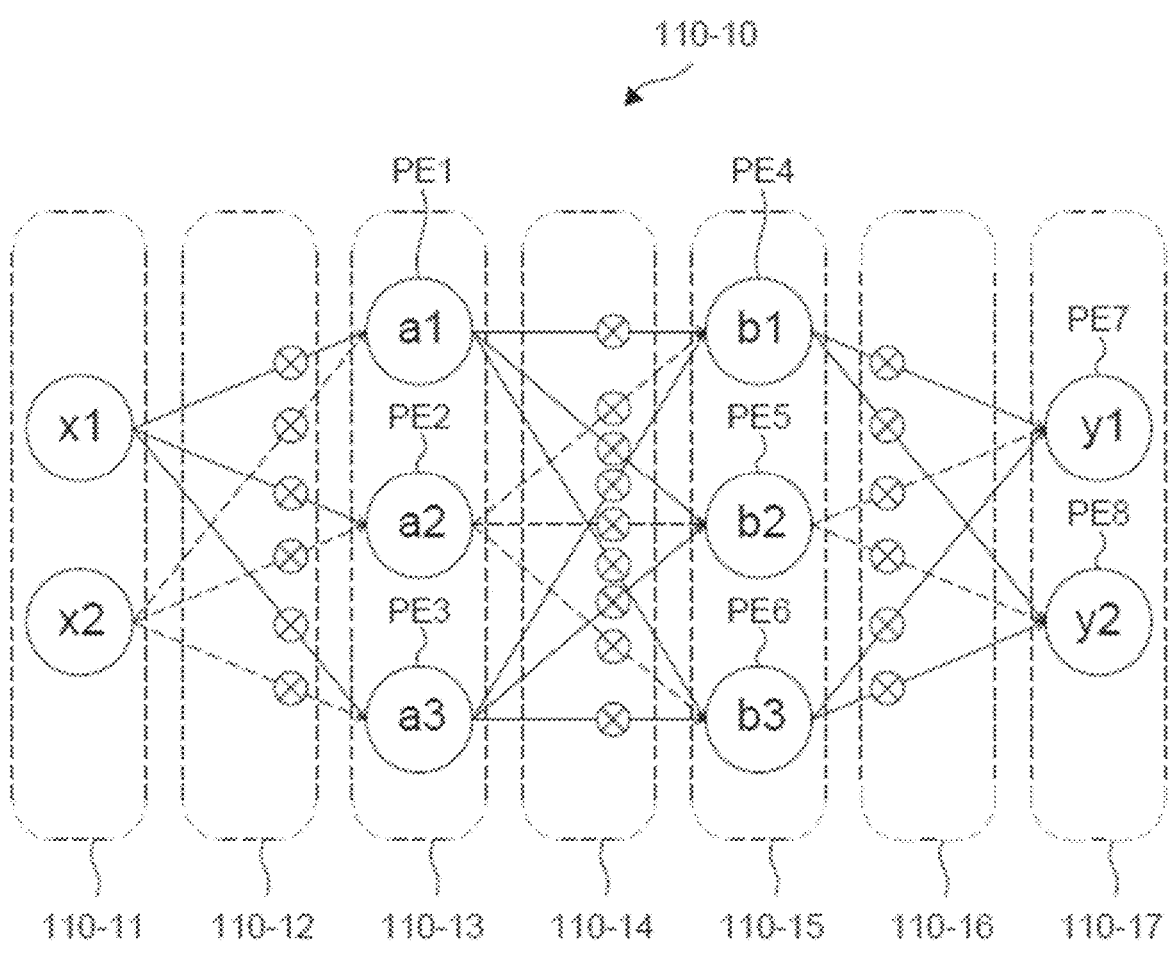
FIG. 8 is a schematic conceptual diagram illustrating an artificial neural network model.

FIG. 8 illustrates an example of an artificial neural network model.

Hereinafter, an operation of an exemplary artificial neural network model 110-10 which may operate in the NPU 100 will be explained.

The artificial neural network model 110-10 of FIG. 4 may be an artificial neural network that is trained in the NPU 100 as shown in FIG. 1 or FIG. 4 or trained in a separate machine learning device. The artificial neural network model may be an artificial neural network that is trained to perform various inference functions such as object recognition or voice recognition.

The artificial neural network model 110-10 may be a deep neural network (DNN).

However, the artificial neural network model 110-10 according to the examples of the present disclosure is not limited to the deep neural network.

For example, the artificial neural network model may be a trained model to perform inference such as object detection, object segmentation, image/video reconstruction, image/video enhancement, object tracking, event recognition, event prediction, anomaly detection, density estimation, event search, measurement, and the like.

For example, the artificial neural network model can be a model such as Transformer, YOLO, CNN, PIDNet, BiseNet, RCNN, VGG, VGG16, DenseNet, SegNet, DeconvNet, DeepLAB V3+, U-net, SqueezeNet, Alexnet, ResNet18, MobileNet-v2, GoogLeNet, Resnet-v2, Resnet50, Resnet101, Inception-v3, and the like. However, the present disclosure is not limited thereto. Further, the artificial neural network model 110-10 may be an ensemble model based on at least two different models.

Hereinafter, an inference process by the example artificial neural network model 110-10, being performed by the NPU 100, will be described.

The artificial neural network model 110-10 may be an example of a deep neural network model including an input layer 110-11, a first connection network 110-12, a first hidden layer 110-13, a second connection network 110-14, a second hidden layer 110-15, a third connection network 110-16, and an output layer 110-17. However, the present disclosure is not limited only to the artificial neural network model illustrated in FIG. 8. The first hidden layer 110-13 and the second hidden layer 110-15 may also be referred to as a plurality of hidden layers.

The input layer 110-11 may, as an example, include input nodes x1 and x2. That is, the input layer 110-11 may include information about two input values.

For example, the first connection network 110-12 may include information about six weight values for connecting nodes of the input layer 110-11 to nodes of the first hidden layer 110-13, respectively. Each weight value is multiplied with the input node value, and an accumulated value of the multiplied values is stored in the first hidden layer 110-13. Here, weight values and input node values may be referred to as parameters of an artificial neural network model.

For example, the first hidden layer 110-13 may include nodes a1, a2, and a3. That is, the first hidden layer 110-13 may include information about three node values.

The first processing element PE1 of FIG. 8 may process the operation of node a1.

The second processing element PE2 of FIG. 8 may process the operation of node a2.

The third processing element PE3 of FIG. 8 may process the operation of node a3.

For example, the second connection network 110-14 may include information about nine weight values for connecting nodes of the first hidden layer 110-13 to nodes of the second hidden layer 110-15, respectively. The weight value of the second connection network 110-14 is multiplied with the node value input from the corresponding first hidden layer 110-13 and the accumulated value of the multiplied values is stored in the second hidden layer 110-15.

For example, the second hidden layer 110-15 may include nodes b1, b2, and b3. That is, the second hidden layer 110-15 may include information about three node values.

The fourth processing element PE4 of FIG. 8 may process the operation of the b1 node.

The fifth processing element PE5 of FIG. 8 may process the operation of node b2.

The sixth processing element PE6 of FIG. 8 may process the operation of node b3.

For example, the third connection network 110-16 may include information about six weight values which connect nodes of the second hidden layer 110-15 and nodes of the output layer 110-17, respectively. The weight value of the third connection network 110-16 is multiplied with the node value input from the second hidden layer 110-15, and the accumulated value of the multiplied values is stored in the output layer 110-17.

For example, the output layer 110-17 may include nodes y1 and y2. That is, the output layer 110-17 may include information about two node values.

The seventh processing element PE7 of FIG. 8 may process the operation of node y1.

The eighth processing element PE8 of FIG. 8 may process the operation of node y2.

Figure 9A:
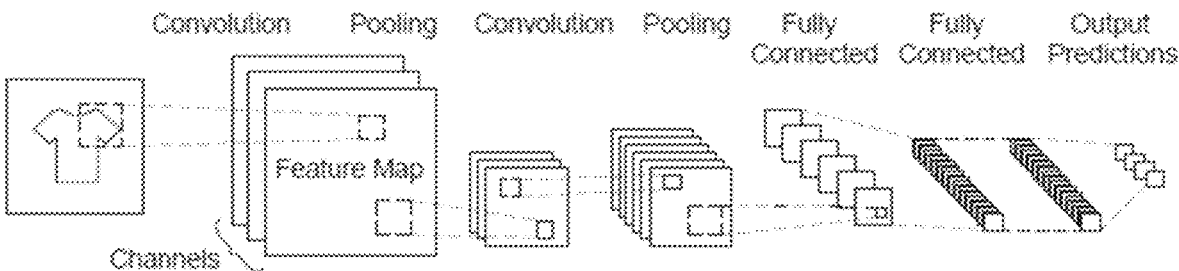
FIG. 9A is a diagram illustrating a basic structure of a convolutional neural network.

FIG. 9A diagrams the basic structure of a convolutional neural network (CNN).

Referring to FIG. 9A, an input image may be displayed as a two-dimensional matrix composed of rows of a specific size and columns of a specific size. An input image may have a plurality of channels, where the channels may represent the number of color components of the input data image.

The convolution process means performing a convolution operation with a kernel while traversing the input image at specified intervals.

A convolutional neural network may have a structure in which an output value (convolution or matrix multiplication) of a current layer is transferred as an input value of a next layer.

For example, convolution is defined by two main parameters (input feature map and kernel). Parameters may include input feature maps, output feature maps, activation maps, weights, kernels, attention (Q, K, V) values, and the like.

Convolution slides the kernel window over the input feature map. The step size by which the kernel slides over the input feature map is called the stride.

After convolution, pooling may be applied. In addition, a fully-connected (FC) layer may be disposed at an end of the convolutional neural network.

Figure 9B:
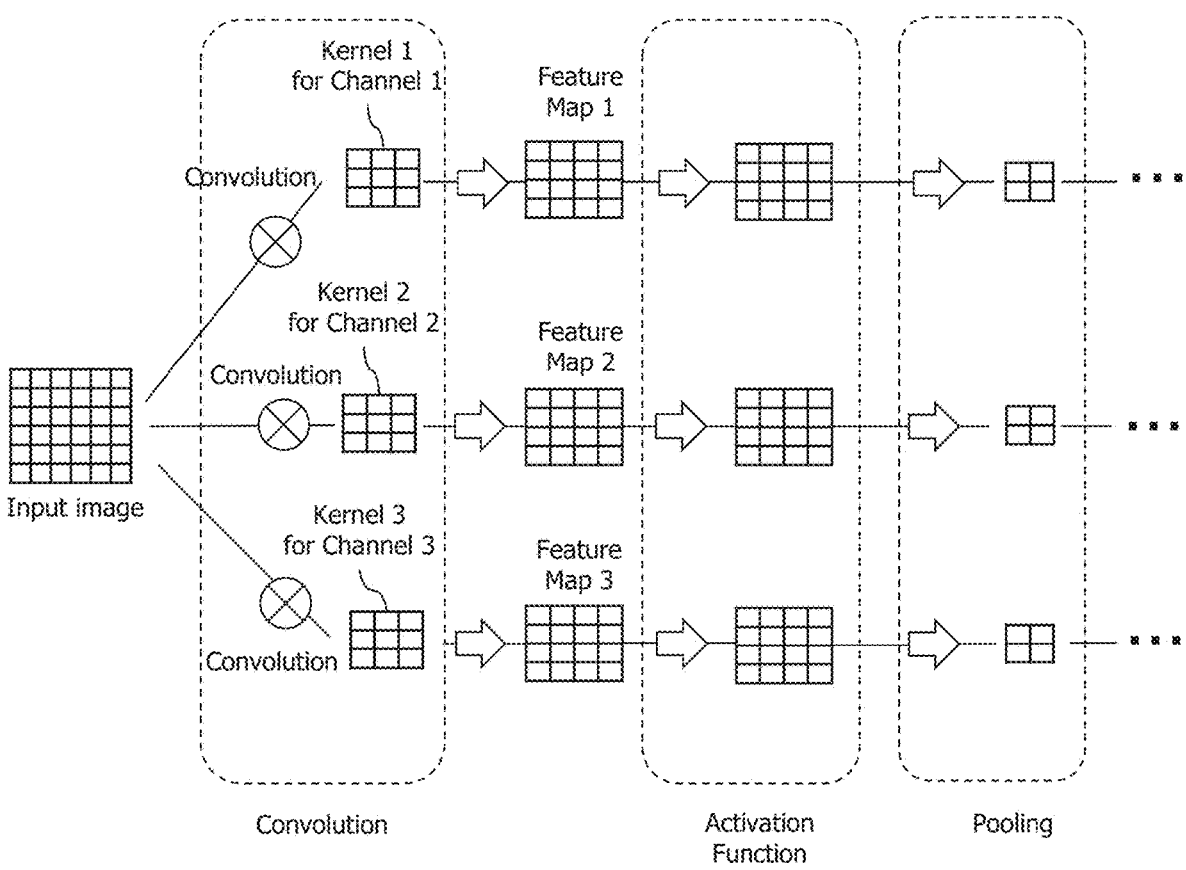
FIG. 9B is a comprehensive diagram showing the operation of a convolutional neural network.

FIG. 9B is a comprehensive diagram showing the operation of a convolutional neural network.

Referring to FIG. 9B, an input image is illustratively represented as a two-dimensional matrix having a size of 6×6. In addition, FIG. 9B illustrates three nodes, channel 1, channel 2, and channel 3.

First, the convolution operation will be described.

The input image (shown as an example of size 6×6 in FIG. 9B) is convolved with a kernel 1 (shown as an example of size 3×3 in FIG. 9B) for channel 1 at the first node, resulting in the output feature map 1 (shown as an example of size 4×4 in FIG. 9B). Similarly, the input image (shown as an example of size 6×6 in FIG. 9B) is convolved with a kernel 2 (shown as an example of size 3×3 in FIG. 9B) for channel 2 at the second node, resulting in the output feature map 2

(shown as an example of size 4×4 in FIG. 9B). Additionally, the input image is convolved with a kernel 3 (shown as an example of size 3×3 in FIG. 9B) for channel 3 at the third node, resulting in the output feature map 3 (shown as an example of size 4×4 in FIG. 9B).

To process each convolution, the processing elements PE1 to PE12 of the NPU 100 are configured to perform a MAC operation.

Next, the operation of the activation function will be described.

The feature map 1, the feature map 2, and the feature map 3 (which are represented as 4×4 examples in FIG. 9B) generated from convolutional operations can be subjected to activation functions. The output after the activation function is applied may have a size of 4×4, for example.

Next, a pooling operation will be described.

Feature map 1, feature map 2, and feature map 3 output from the activation function (each size is exemplarily represented as 4×4 in FIG. 9B) are input to three nodes. Pooling may be performed by receiving feature maps output from the activation function as inputs. The pooling may reduce the size or emphasize a specific value in the matrix. Pooling methods include maximum pooling, average pooling, and minimum pooling. Maximum pooling is used to collect the maximum values in a specific region of the matrix, average pooling can be used to find the average within a specific region, and minimum pooling is used to collect the minimum values in a specific region of the matrix.

In the example of FIG. 9B, it is shown that a feature map having a size of 4×4 is reduced to a size of 2×2 by pooling.

Specifically, the first node receives feature map 1 for channel 1 as an input, performs pooling, and outputs, for example, a 2×2 matrix. The second node receives feature map 2 for channel 2 as an input, performs pooling, and outputs, for example, a 2×2 matrix. The third node receives feature map 3 for channel 3 as an input, performs pooling, and outputs, for example, a 2×2 matrix.

The aforementioned convolution, activation function, and pooling are repeated, and finally, it can be output as fully connected as shown in FIG. 9A. The corresponding output may be input again to an artificial neural network for image recognition. However, the present disclosure is not limited to the sizes of feature maps and kernels.

The CNN described so far is the most used method in the field of computer vision among various deep neural network (DNN) methods. In particular, CNNs have shown remarkable performance in various research areas performing various tasks such as image classification and object detection.

Video Coding for Machines

Recently, with the development of various industrial fields such as surveillance, intelligent transportation, smart city, intelligent industry, and intelligent Content, the amount of image or feature map data consumed by machines is increasing. On the other hand, the traditional image compression method currently in use is a technology developed in consideration of the characteristics of human vision perceived by the viewer and contains unnecessary information, making it inefficient in performing machine tasks. Therefore, there is a demand for a study on a video codec technology for efficiently compressing a feature map for performing a machine task.

Video coding for machine (VCM) technology is being discussed in the Moving Picture Experts Group (MPEG), an international standardization group for multimedia encoding. VCM is an image or feature map encoding technology that is based on the machine vision, not the viewer's point of view.

Present Disclosure

FIGS. 10A to 10D respectively illustrate configurations of an NPU including a VCM encoder and an NPU including a VCM decoder.

Figure 10A:
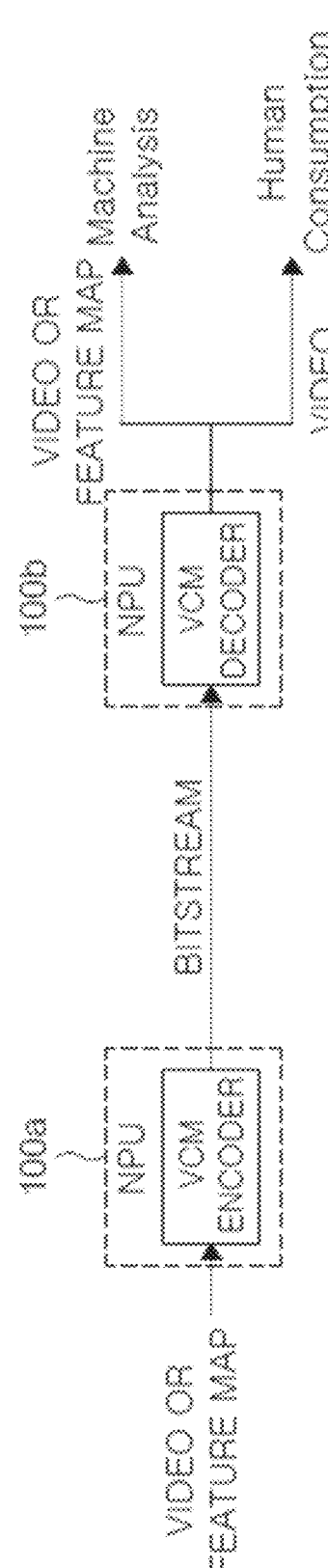
FIGS. 10A to 10D are illustrative views respectively illustrating configurations of an NPU including a VCM encoder and an NPU including a VCM decoder.

Referring to FIG. 10A, the first NPU 100a may include a VCM encoder, and the second NPU 100b may include a VCM decoder.

When the VCM encoder in the first NPU 100a encodes the video and/or the feature map and transmits it as a bitstream, the VCM decoder in the second NPU 100b may decode and output the bitstream. In this case, the VCM decoder in the second NPU 100b may output one or more videos and/or feature maps. For example, the VCM decoder in the second NPU 100b may output a first feature map for analysis using a machine, and may output a first image for viewing by a user. The first image may have a higher resolution than that of the first feature map.

Figure 10B:
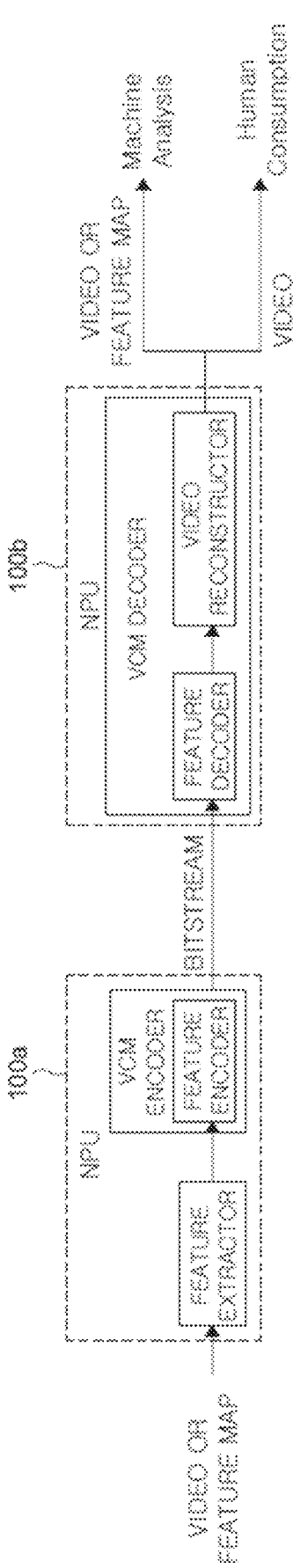

Referring to FIG. 10B, the first NPU 100a may include a feature extractor for extracting a feature map and a VCM encoder.

The VCM encoder in the first NPU 100a may include a feature encoder. The second NPU 100b may include a VCM decoder. The VCM decoder in the second NPU 100b may include a feature decoder and a video reconstructor. The feature decoder may decode the feature map from the bitstream and output a first feature map for analysis using a machine. The video regenerator may regenerate and output a first image for viewing by a user from a bitstream.

Figure 10C:
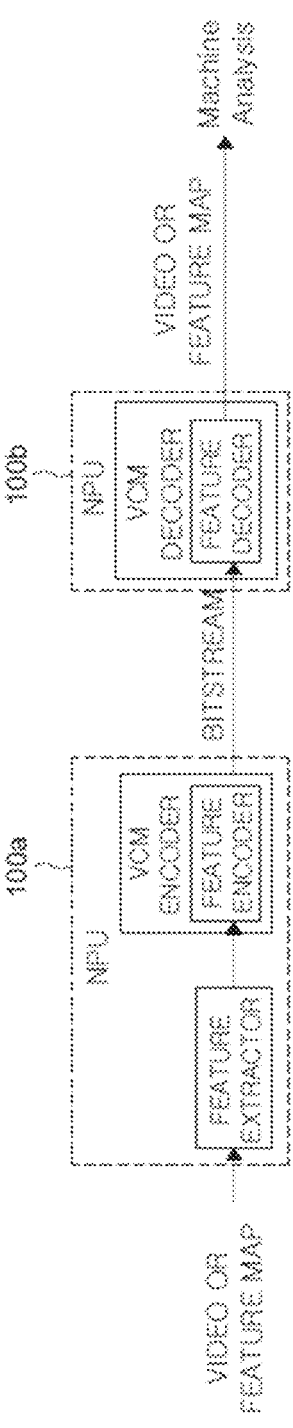

Referring to FIG. 10C, the first NPU 100a may include a feature extractor for extracting a feature map and a VCM encoder.

The VCM encoder in the first NPU 100a may include a feature encoder. The second NPU 100b may include a VCM decoder. The VCM decoder in the second NPU 100b may include a feature decoder. The feature decoder may decode the feature map from the bitstream and output a first feature map for analysis using a machine. That is, the bitstream can be encoded only as a feature map, not as an image. In more detail, the feature map may be data including information on features for processing a specific task of a machine based on an image.

Figure 10D:
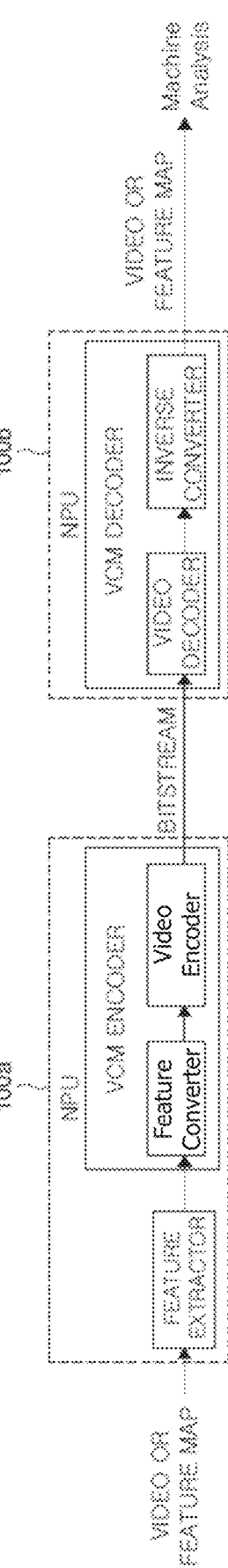

Referring to FIG. 10D, the first NPU 100a may include a feature extractor for extracting a feature map and a VCM encoder.

The VCM encoder in the first NPU 100a may include a feature extractor and a video encoder. The second NPU 100b may include a VCM decoder. The VCM decoder in the second NPU 100b may include a video decoder and an inverse converter.

Referring to FIGS. 10A to 10D, the first NPU 100a may include at least a VCM encoder, and the second NPU 100b may include at least a VCM decoder. However, the present disclosure is not limited thereto, and the VCM encoder may be modified to include the first NPU 100a, or the VCM decoder may be modified to include the second NPU 100b.

The first NPU 100a may generate a feature map by processing an artificial intelligence operation (e.g., convolution). The first NPU 100a may transmit the generated feature map after encoding the feature map by processing the artificial intelligence operation.

The second NPU 100b may receive the encoded feature map. The second NPU 100b may decode the encoded feature map by processing an artificial intelligence operation (e.g., deconvolution).

In order to process artificial intelligence computation, an artificial neural network model of a specific structure can be used. For example, for feature map extraction, the NPU may process a convolution operation. For example, for feature map encoding, the NPU may process a convolution operation. For example, for decoding the encoded feature map, the NPU may process a deconvolution operation.

The artificial neural network model may have a multi-layered structure, and the artificial neural network model may include a backbone network. The feature map generated through the artificial intelligence operation of the first NPU 100a may be a feature map generated in a specific layer of the multi-layered artificial neural network model. That is, the feature map may be at least one feature map generated in at least one layer of the multi-layered artificial neural network model. The feature map generated in a specific layer of the multi-layered artificial neural network model may be a feature map suitable for analysis using a specific machine.

Figure 11A:
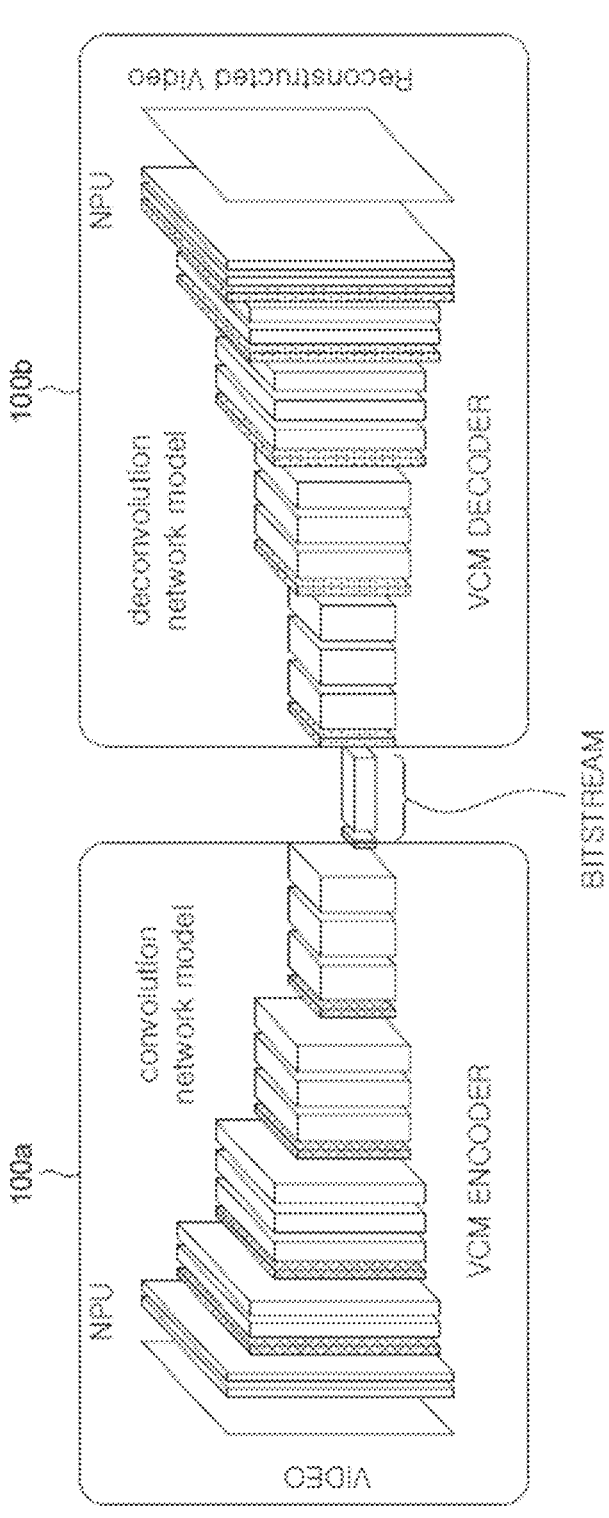
FIGS. 11A and 11B are illustrative diagrams respectively illustrating positions of a bitstream in an artificial neural network model.
Figure 11B:
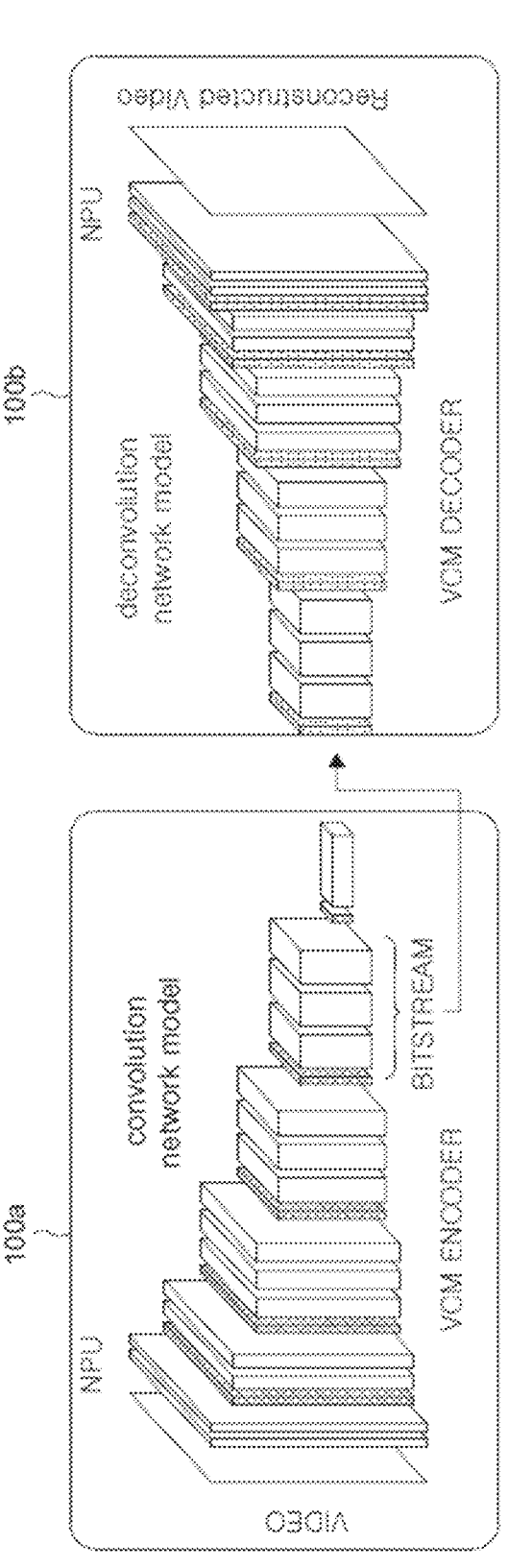

FIGS. 11A and 11B respectively illustrate positions of a bitstream in an artificial neural network model.

As can be seen with reference to FIG. 11A, when the first NPU 100a or the VCM encoder receives a video, using an artificial neural network model (e.g., a convolutional network model), it is possible to generate feature maps. FIG. 11A shows an example of transmitting a feature map in a fully connected layer corresponding to the last layer of the convolutional network model as a bitstream.

Then, the second NPU 100b or the VCM decoder may decode the bitstream including the feature map using the deconvolution network model.

On the other hand, referring to FIG. 11B, an example is shown in which feature maps generated in intermediate layers of an artificial neural network model (e.g., a convolutional network model) are transmitted as a bitstream, rather than transmission of a feature map in a fully connected layer as a bitstream.

Figure 12:
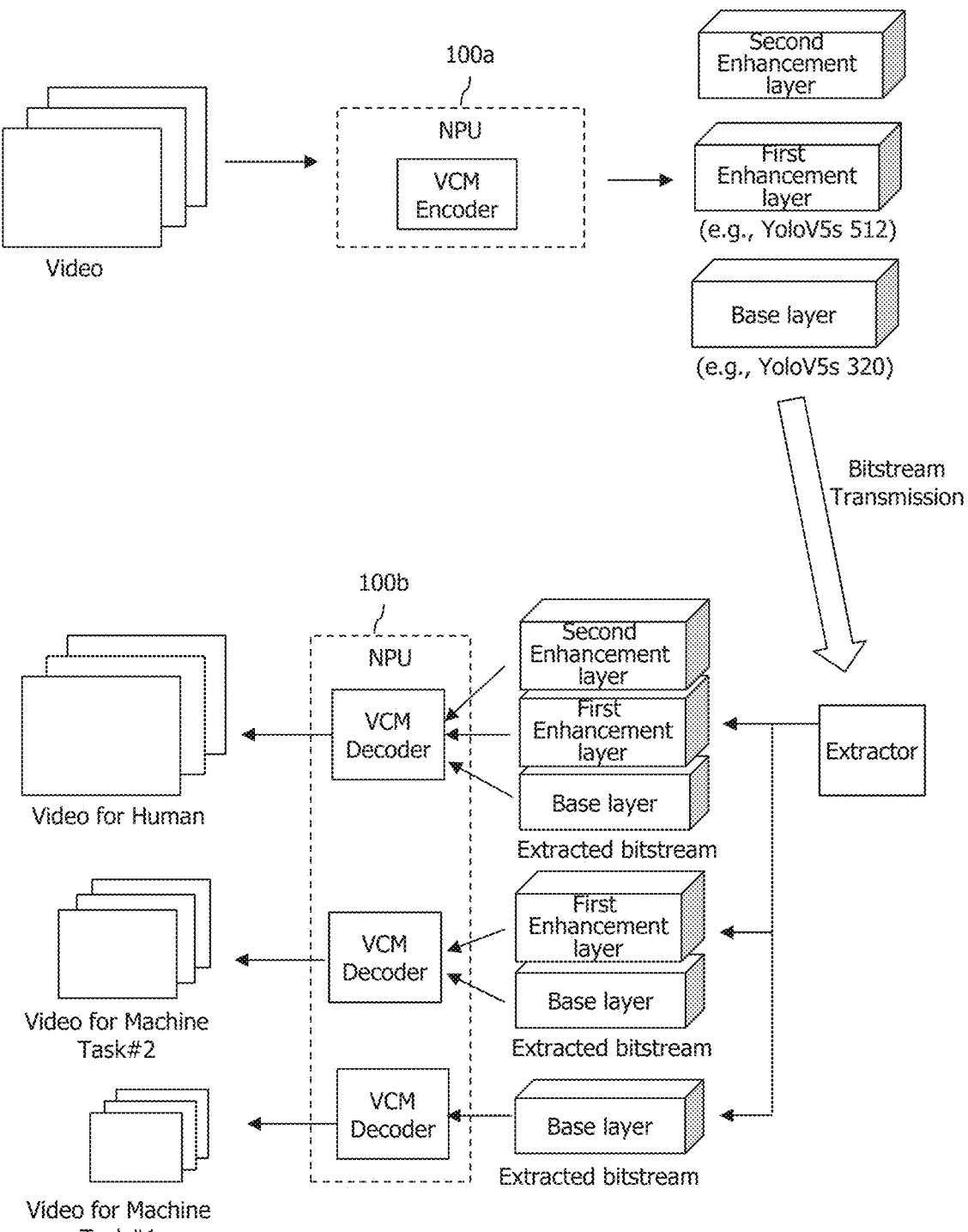
FIG. 12 is a schematic view illustrating an example of the present disclosure.

FIG. 12 illustrates an example of the present disclosure.

Referring to FIG. 12, the first NPU 100a and the second NPU 100b are shown.

First, information about an artificial neural network (ANN) model, for example, information including weights according to YoloV5s, may be transmitted to the first NPU 100a and the second NPU 100b, respectively.

The first NPU 100a may include a VCM encoder for encoding the input video. Although not shown, the first NPU 100a may further include a feature extractor as shown in FIG. 10B, 10C, or 10D. The VCM encoder in the first NPU 100a may include a feature encoder as shown in FIG. 10B or 10C. Alternatively, the VCM encoder in the first NPU 100a may include a feature converter and/or a video encoder as shown in FIG. 10D.

The second NPU 100b may include at least one VCM decoder. The VCM decoder in the second NPU 100b may include a feature decoder and/or a video regenerator as shown in FIG. 10B. Alternatively, the VCM decoder in the second NPU 100b may include a feature decoder as shown in FIG. 10C. Alternatively, the VCM decoder in the second NPU 100b may include a video decoder and/or an inverse converter as shown in FIG. 10D.

The VCM encoder in the first NPU 100a may support various scalable encoding modes. For example, a mode for spatial scalability provides layers of spatial resolution, and a mode for temporal scalability provides layers of frame rate. In addition, quality scalability and complexity scalability provide a layer of visual quality of an image and a layer of complexity of a decoding method.

The base layer of the image and/or feature map with spatial scalability includes encoded frames of reduced resolution. When only the base layer is decoded, a low-resolution output image can be obtained. Decoding at least one enhancement layer along with the base layer can provide a high-resolution output image and/or feature map.

The VCM encoder in the first NPU 100a performs SVC or SFC encoding on the original video and/or feature map (e.g., UHD or FHD video), so that it can be divided into video or feature map streams of several layers and transmitted. As illustrated, a plurality of layers may include, for example, a base layer, a first enhancement layer, and a second enhancement layer.

The base layer may include first feature maps encoded using a first artificial neural network model (e.g., YoloV5s 320), and the first enhancement layer may include second feature maps encoded using a second artificial neural network model (e.g., YoloV5s 512).

The second enhancement layer may include third feature maps encoded using a second artificial neural network model. In other words, the first feature maps included in the base layer may be related to the first artificial neural network model, the second feature maps included in the first enhancement layer may be related to a second artificial neural network model, and the third feature maps included in the second enhancement layer may be related to a third artificial neural network model.

Alternatively, the second enhancement layer may be encoded using a video encoder in the VCM encoder shown in FIG. 10D.

However, the present disclosure is not limited to the enhancement layer, and the enhancement layer may be referred to as various layers such as an extension layer, an additional layer, and a lower layer.

The artificial neural network model may be, for example, YOLO. The you-only-look-once (YOLO) is an algorithm for object detection, and is an algorithm that can predict an object existing in an image and the position of the object by viewing the image only once. Instead of detecting it as an object to be classified, it approaches a single regression problem by dividing the bounding box multidimensionally and applying class probability. The input image is divided into a grid form of a tensor through CNN, and an object in the corresponding area is recognized by generating an object bounding box and class probability according to each section. Because YOLO does not apply a separate network for extracting candidate regions, it shows superior performance in terms of processing time than Faster R-CNN.

A video stream including the base layer, the first enhancement layer, and the second enhancement layer may be transmitted. The base layer may include the first feature map, the first enhancement layer may include the second feature map, and the second enhancement layer may include the third feature map.

As described above, the first feature map included in the base layer in the bitstream may be related to the first artificial neural network model. The second feature map included in the first enhancement layer in the bitstream may be related to a second artificial neural network model. Also, the third feature map included in the second enhancement layer in the bitstream may be related to a third artificial neural network model.

The VCM encoder may generate a bitstream including a specific number of enhancement layers according to an available bandwidth of a transmission channel.

The VCM encoder may generate a bitstream in which at least one enhancement layer is selectively omitted according to an available bandwidth of a transmission channel.

The VCM encoder may generate a bitstream to which at least one enhancement layer is selectively added according to an available bandwidth of a transmission channel.

The VCM decoder may operate to receive only the base layer and at least some enhancement layers of the bitstream.

The available bandwidth of the transmission channel may vary in real time or at a specific period. The available bandwidth of the transmission channel may be varied due to various reasons. For example, the bandwidth of a transmission channel may be reduced for a specific time according to an increase of data to be communicated.

Accordingly, the VCM encoder may be configured to acquire the available bandwidth of the transmission channel. The VCM encoder may alter the number of enhancement layers according to available bandwidth.

The VCM encoder may be configured to encode the enhancement layer information included in the bitstream. Accordingly, the VCM decoder may be configured to determine the number of enhancement layers of the bitstream. In addition, the VCM decoder may be configured to detect an available bandwidth of the transmission channel. The number of at least one enhancement layer included in one received frame may vary according to the state of the transmission channel.

The NPU may determine the number of at least one enhancement layer included in the one received frame according to the state of a transmission channel, and feed it back to the encoding device.

The at least one enhancement layer may be included in the one frame in an ascending order according to an index of at least one enhancement layer.

The extractor may extract the base layer and at least one enhancement layer from the received bitstream and transmit to the second NPU 100b.

The second NPU 100b may decode by an suitable VCM decoder according to a required task.

For example, as illustrated, for machine task No. 1, only the base layer in the video stream can be decoded. For decoding of the base layer, a first artificial neural network model (e.g., YoloV5s 320) may be used.

Alternatively, for machine task No. 2, only the base layer and the first enhancement layer in the video stream can be decoded. For decoding of the base layer and the first enhancement layer, a second artificial neural network model (e.g., YoloV5s 512) may be used.

Alternatively, for viewing by a user, the base layer and the first enhancement layer and the second enhancement layer in the video stream may be decoded.

Figure 13:
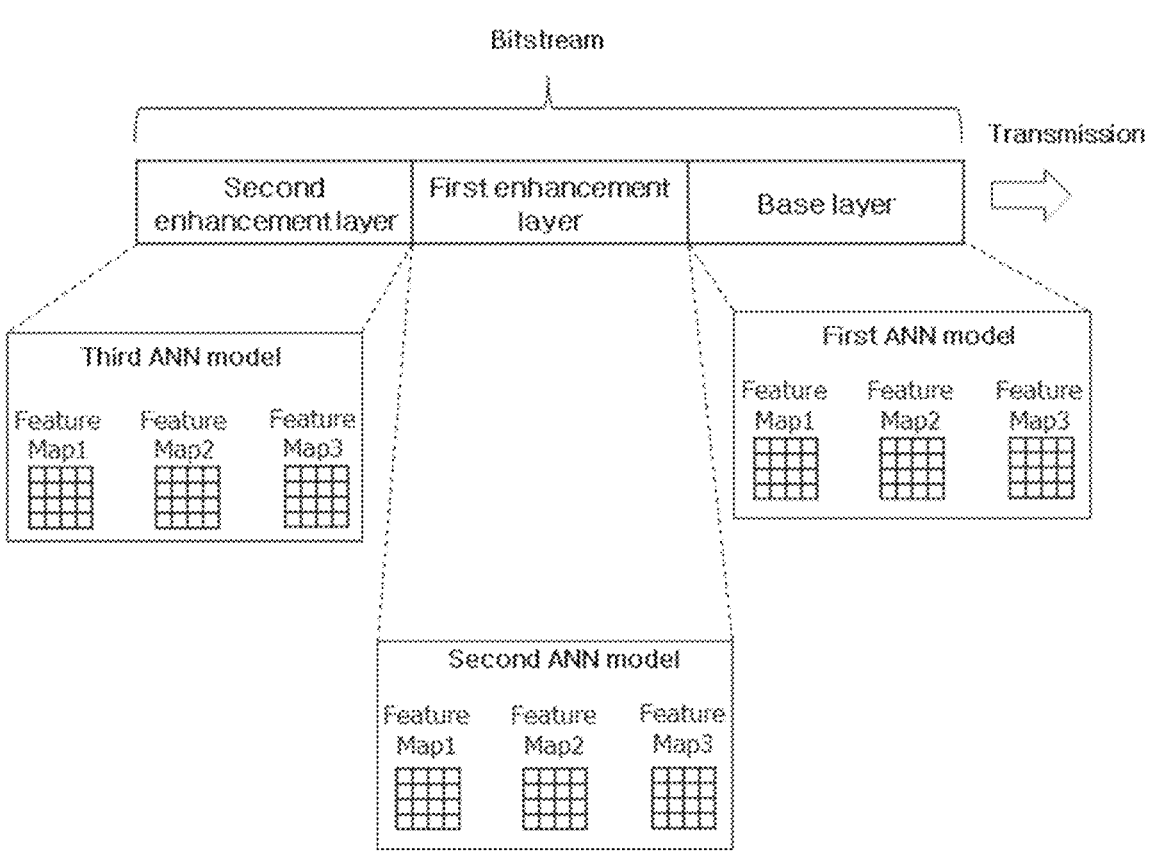
FIG. 13 is a schematic diagram illustrating a first example of a bitstream according to the present disclosure.

FIG. 13 is a schematic diagram illustrating a first example of a bitstream according to one disclosure of the present specification.

The bitstream transmitted from the first NPU 100a including the VCM encoder may include one or more of a base layer, a second enhancement layer, and a second enhancement layer as shown in FIG. 13.

A base layer in the bitstream may include the plurality of first feature maps. A plurality of first feature maps included in the base layer may be related to a first artificial neural network model.

The first enhancement layer in the bitstream may include a plurality of second feature maps. A plurality of second feature maps included in the first enhancement layer may be related to a second artificial neural network model.

The second enhancement layer in the bitstream may include third feature maps. A plurality of third feature maps included in the second enhancement layer may be related to a third artificial neural network model.

Figure 14:
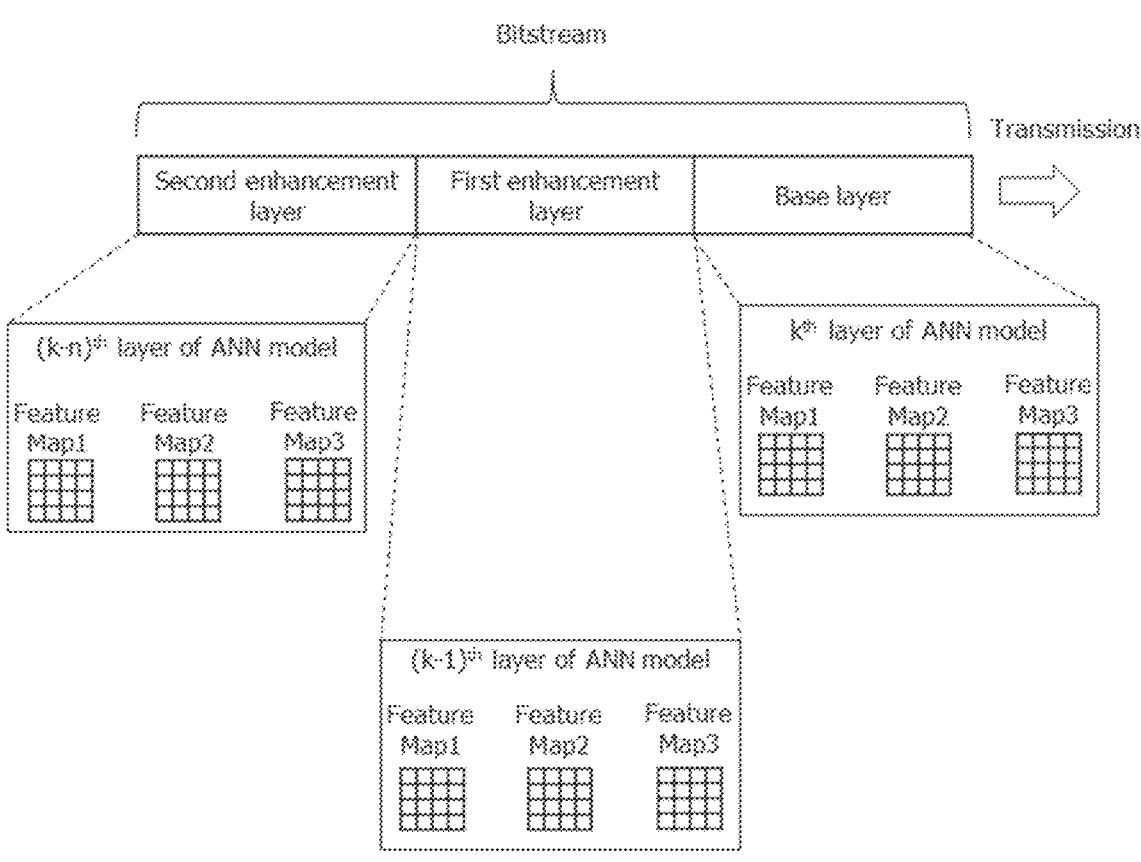
FIG. 14 is a schematic diagram illustrating a second example of a bitstream according to the present disclosure.

FIG. 14 is a schematic diagram illustrating a second example of a bitstream according to the present disclosure.

The bitstream transmitted from the first NPU 100a including the VCM encoder may include one or more of a base layer, a first enhancement layer, and a second enhancement layer as shown in FIG. 14.

A base layer in the bitstream may include a plurality of first feature maps. The plurality of first feature maps included in the base layer may be feature maps output from a k$^{th}$ layer of an artificial neural network model.

The first enhancement layer in the bitstream may include a plurality of second feature maps. The plurality of second feature maps included in the first enhancement layer may be feature maps output from a (k–1)$^{th}$ layer of an artificial neural network model.

The second enhancement layer in the bitstream may include a plurality of third feature maps. The plurality of third feature maps included in the second enhancement layer may be feature maps output from a (k–n)$^{th}$ layer of an artificial neural network model.

The values of k and n may be determined in advance by agreement between the first NPU 100a including the VCM encoder and the second NPU 100b including the VCM decoder. Alternatively, the values of k and n may be independently determined by the first NPU 100a including the VCM encoder. In this case, the first NPU 100a including the VCM encoder may transfer information about the determined values of k and n to the second NPU 100b including the VCM decoder.

Figure 15A:
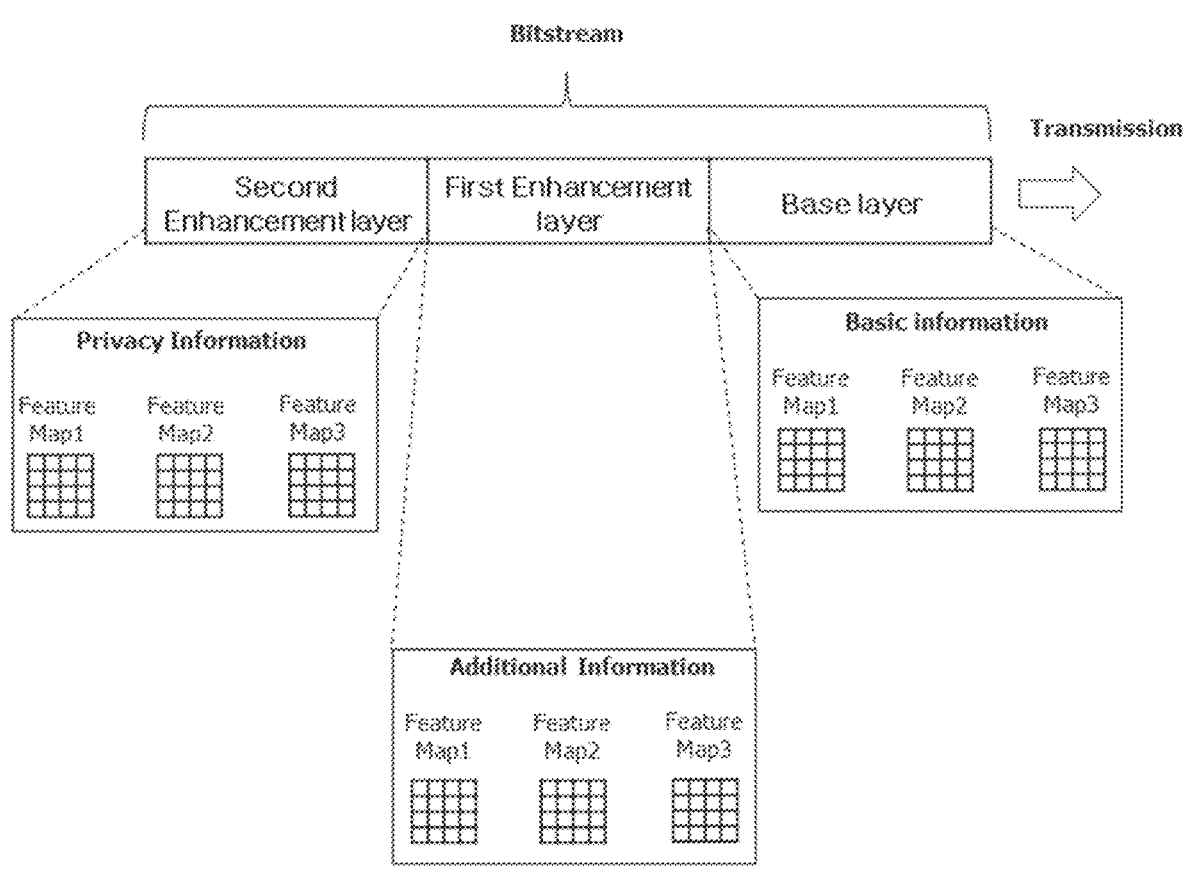
FIG. 15A is a schematic diagram illustrating a third example of a bitstream according to the present disclosure.

FIG. 15A is a schematic diagram illustrating a third example of a bitstream according to the present disclosure.

The bitstream transmitted from the first NPU 100a including the VCM encoder may include one or more of a base layer, a first enhancement layer, and a second enhancement layer as shown in FIG. 15A.

A basic layer in the bitstream may include basic information. The basic information may be related to a plurality of first feature maps.

A first enhancement layer in the bitstream may include first additional information. The first additional information may be related to a plurality of second feature maps.

A second enhancement layer in the bitstream may contain privacy information. The privacy information may be related to a plurality of third feature maps.

Figure 15B:
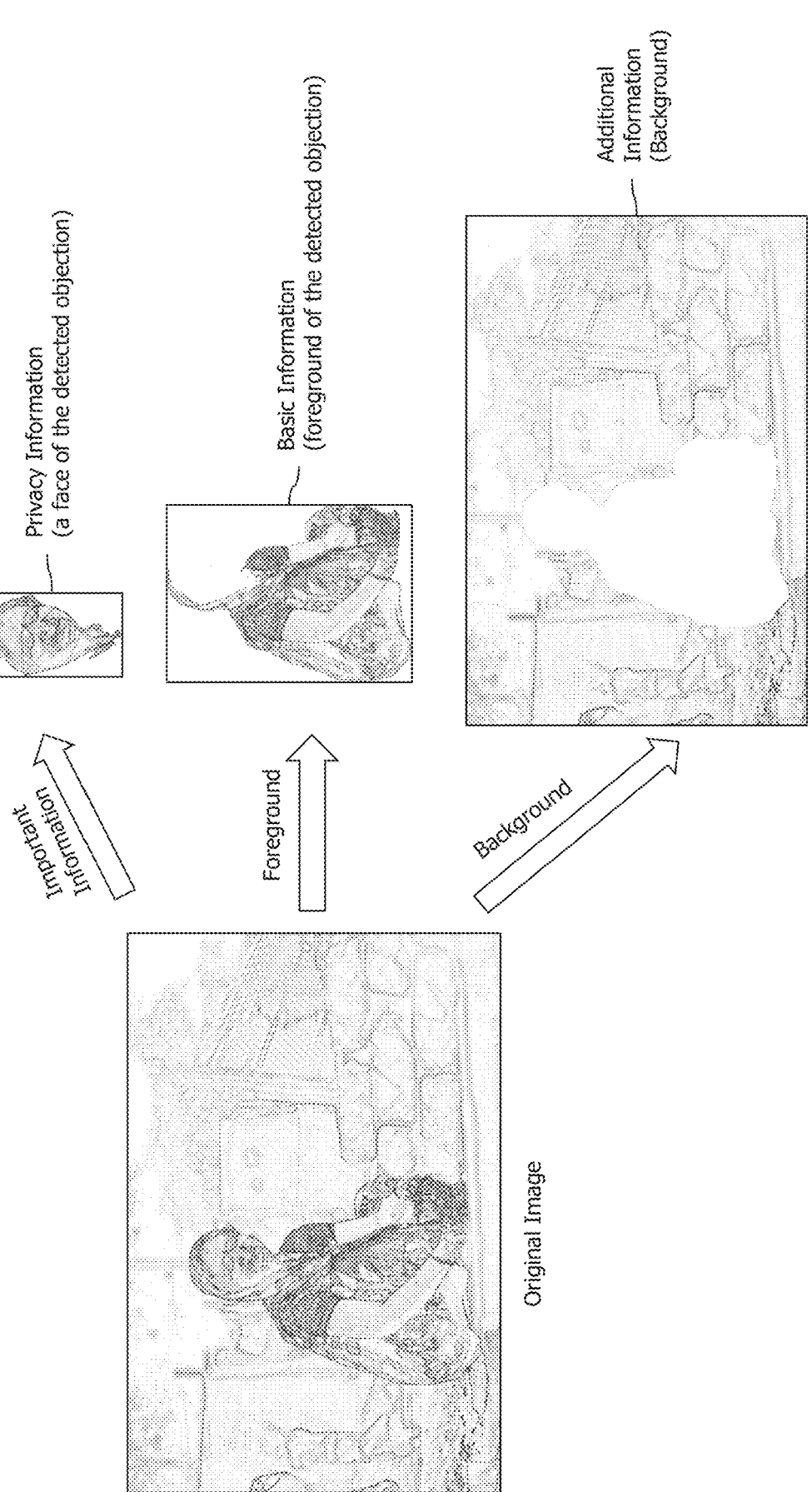
FIG. 15B is a schematic diagram illustrating an example of the third example shown in FIG. 15A.

FIG. 15B is a schematic diagram illustrating an application example of the third example shown in FIG. 15A.

Like the application example shown in FIG. 15B, an image can be divided into foreground, background, and important information.

For example, the foreground may be an object to be detected, that is, a person, as in the application example shown in FIG. 15B. The foreground may correspond to basic information shown in FIG. 15A. Accordingly, the plurality of first feature maps extracted from the foreground are included in the basic information shown in FIG. 15A and can be transmitted as a base layer in the bitstream.

The background may be a portion other than an object (e.g., a person) to be detected as shown in FIG. 15B. The background may correspond to the additional information shown in FIG. 15A. Accordingly, the plurality of second feature maps extracted from the background may be included in the additional information shown in FIG. 15A and transmitted as the first enhancement layer in the bitstream.

The important information may be, for example, a main part of an object (e.g., a human face) to be detected as shown in FIG. 15B. The important information may correspond to privacy information shown in FIG. 15A. Accordingly, the plurality of third feature maps extracted from the important information may be included in the privacy information shown in FIG. 15A and transmitted as the second enhancement layer in the bitstream.

Meanwhile, in a scenario in which a threatening person needs to be detected, the foreground may be a threatening person in an image, the background may be a background of a place where the threatening person is located, and the privacy information may be face information of people around the threatening person.

In FIG. 15B, the original image is illustrated as including an object (e.g., a person) to be detected. However, an object to be detected may be another object or a vehicle.

For example, when an object to be detected is a vehicle, the foreground may be the exterior of the vehicle, the background may be the rest of the vehicle, and the privacy information may be the license plate of the vehicle.

Alternatively, when the object to be detected is a vehicle, the foreground may be the exterior of the vehicle (including the vehicle license plate), the background may be the rest except for the vehicle, and the privacy information may be an image of a person viewed through the vehicle's windshield.

According to an example of the present disclosure, a neural processing unit (NPU) for decoding video and/or feature map may be provided. The NPU may comprise at least one processing element (PE) to perform an inference using an artificial neural network. The at least one PE may be configured to receive and decode data included in a bitstream. The data included in the bitstream may comprises data of a base layer, or the data of the base layer and data of at least one enhancement layer.

The data of the base layer included in the bitstream may include a first feature map. The data of the at least one enhancement layer included in the bitstream may include a second feature map.

The first feature map may be related to a first artificial neural network model. The second feature map may be related to a second artificial neural network model.

The first feature map may be related to the k$^{th}$ layer of an arbitrary artificial neural network model. The second feature map may be related to layers other than the k$^{th}$ layer.

The first feature map may be extracted based on a foreground in an image. The second feature map may be extracted based on a portion of the image other than the foreground.

At least a portion of the at least one enhancement layer of the received bitstream may be configured to be selectively processed.

At least one enhancement layer among a plurality of enhancement layers may be selectively processed according to an available bandwidth of a transmission channel of the received bitstream.

The NPU may be configured to selectively process at least a portion of the at least one enhancement layer according to a preset machine analysis task.

The NPU may be configured to detect an available bandwidth of a transmission channel of the received bitstream.

The NPU may be configured to selectively process at least a portion of the at least one enhancement layer according to a preset machine analysis task by using the at least one PE.

The number of one or more enhancement layers included in one received frame may vary according to the state of a transmission channel.

The NPU may be configured to determine a number of the at least one enhancement layer included in one frame according to a condition of a transmission channel and feedback to an encoder.

The at least one enhancement layer is included in one frame in ascending order according to indexes of layers of the at least one enhancement layer.

A neural processing unit (NPU) for encoding video or feature map may be provided. The NPU may comprise at least one processing element (PE) to perform an inference using an artificial neural network. The at least one PE may be configured to receive and encode a transmitted video or feature map. The at least one PE may be configured to output a bitstream including data of a base layer and data of at least one enhancement layer.

The data of the base layer included in the bitstream may include a first feature map. The data of the at least one enhancement layer included in the bitstream may include a second feature map.

The bitstream may be configured such that the number of one or more enhancement layers is adjusted according to an available bandwidth of a transmission channel.

The number of the one or more enhancement layers of the bitstream may be adjusted at least one frame interval.

The NPU may be configured to selectively process at least a portion of the at least one enhancement layer according to a preset machine analysis task by using the at least one PE.

The NPU may be configured to process a base layer and a first enhancement layer according to the one or more PEs according to a first machine analysis task.

The NPU may be configured to process a base layer, a first enhancement layer, and a second enhancement layer according to a second machine analysis task of the one or more PEs.

The number of one or more enhancement layers included in the one frame may vary according to the state of a transmission channel.

The NPU may be configured to receive feedback from a decoder of the number of one or more enhancement layers included in the one frame.

The first feature map may be related to a first artificial neural network model, and the second feature map is related to a second artificial neural network model.

The first feature map may be related to the k$^{th}$ layer of an arbitrary artificial neural network model, and the second feature map may be related to layers other than the k$^{th}$ layer.

The first feature map may be extracted based on a foreground in an image, and the second feature map may be extracted based on a portion of the image other than the foreground.

The at least one PE may be configured to selectively process at least a portion of the at least one enhancement layer according to a preset machine analysis task.

The at least one PE may be configured to process the base layer and a first enhancement layer according to a first machine analysis task.

The at least one PE may be configured to process the base layer, a first enhancement layer, and a second enhancement layer according to a second machine analysis task.

The NPU may be configured to receive feedback on a number of at least one enhancement layer included in one frame from a decoder.

The at least one enhancement layer may be included in one frame in ascending order according to an index of layers of the at least one enhancement layer.

According to an example of the present disclosure, a VCM decoder for decoding video and/or feature map may be provided. The VCM decoder may comprise at least one processing element (PE) to perform an inference using an artificial neural network. The at least one PE may be configured to receive and decode data included in a bitstream. The data included in the bitstream may comprise data of a base layer. Alternatively, the data included in the bitstream may comprise the data of the base layer and data of at least one enhancement layer.

The data of the base layer included in the bitstream may include a first feature map. The data of the at least one enhancement layer included in the bitstream may include a second feature map.

According to an example of the present disclosure, a VCM encoder for encoding video and/or feature map may be provided. The VCM encoder may comprise at least one processing element (PE) to perform an inference using an artificial neural network. The at least one PE may be configured to receive and encode a transmitted video or feature map. The at least one PE may be configured to output a bitstream including data of a base layer and data of at least one enhancement layer.

The data of the base layer included in the bitstream may include a first feature map. The data of the at least one enhancement layer included in the bitstream may include a second feature map.

Examples of the present disclosure are merely examples, provided to easily explain the technical content of the present disclosure and to help the understanding of the present disclosure, and are not intended to limit the scope of the present disclosure. It will be apparent to those of ordinary skill in the art to which the present disclosure pertains those other modified examples may be implemented in addition to the examples described above.

The claims described herein may be combined in various ways. For example, the technical features of the method claim of the present disclosure may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

[National R&D Project Supporting this Invention]
    [Task Identification Number] 1711193247
    [Task Number] 2022-0-00248-002
    [Name of Ministry] Ministry of Science and ICT
    [Name of Project Management (Specialized) Institution] Institute of Information & Communications Technology Planning & Evaluation
    [Research Project Title] Development of Core Technology for PIM Artificial Intelligence Semiconductor (Design)
    [Research Task Title] Development of CXL-based PIM semiconductor technology for multiple DRAM modules considering memory consistency
    [Contribution Rate] 1/1
    [Name of Organization Performing the Task] DeepX Co., Ltd.
    [Research period 15 minutes] 2023 Jan. 1~2023 Dec. 31

What is claimed is:

1. A neural processing unit (NPU) comprising: a first circuitry provided for at least one processing element (PE) to perform an inference using an artificial neural network and data included in a bitstream, wherein the data included in the bitstream comprises: first data of a base layer, or the first data of the base layer and second data of at least one enhancement layer, wherein the first data of the base layer includes a first feature map, wherein the second data of the at least one enhancement layer includes a second feature map, wherein the first feature map and the second feature map are different from each other, but have a relationship, wherein the first feature map relates to a background of a first image and the second feature map relates to a privacy-sensitive portion in the first image, wherein the first feature map is used for a first machine analysis task, and wherein both of the first feature map and the second feature map are used for a second machine analysis task.

2. The NPU of claim 1, wherein the first feature map is related to a first artificial neural network model, and wherein the second feature map is related to a second artificial neural network model.

3. The NPU of claim 1, wherein the first feature map is related to a $k^{th}$ layer of an arbitrary artificial neural network model, and wherein the second feature map is related to layers other than the $k^{th}$ layer.

4. The NPU of claim 1, wherein the first feature map is extracted based on a foreground in an image, and wherein the second feature map is extracted based on a portion of the image other than the foreground.

5. The NPU of claim 1, wherein the first feature map relates to a background of a first image and the second feature map relates to a first object in the first image.

6. The NPU of claim 1, wherein the at least one PE is configured to selectively process at least a portion of the at least one enhancement layer according to a preset machine analysis task.

7. The NPU of claim 1, wherein the first feature map is used for a first machine analysis task, and wherein both the first feature map and the second feature map are used for a second machine analysis task.

8. The NPU of claim 1, wherein the at least one enhancement layer is included in one frame in an ascending order according to indexes of layers of the at least one enhancement layer.

9. The NPU of claim 1, wherein the bitstream is received in unit of one frame, and wherein how many enhancement layers are to be included in the second data is determined based on a transmission channel.

10. A neural processing unit (NPU) comprising: a first circuitry provided for at least one processing element (PE) to generate one or more feature maps using an artificial neural network, wherein the one or more feature maps are to be included in a bitstream, wherein the bitstream includes: first data of a base layer; or the first data of the base layer and second data of at least one enhancement layer, wherein the first data of the base layer included in the bitstream includes a first feature map, wherein the second data of the at least one enhancement layer included in the bitstream includes a second feature map, wherein the first feature map and the second feature map are different from each other, but have a relationship, wherein the first feature map relates to a background of a first image and the second feature map relates to a privacy-sensitive portion in the first image, wherein the first feature map is used for a first machine analysis task, and wherein both of the first feature map and the second feature map are used for a second machine analysis task.

11. The NPU of claim 10, wherein the first feature map is related to a first artificial neural network model, and wherein the second feature map is related to a second artificial neural network model.

12. The NPU of claim 10, wherein the first feature map is related to a $k^{th}$ layer of an arbitrary artificial neural network model, and wherein the second feature map is related to layers other than the $k^{th}$ layer.

13. The NPU of claim 10, wherein the first feature map is extracted based on a foreground in an image, and wherein the second feature map is extracted based on a portion of the image other than the foreground.

14. The NPU of claim 10, wherein the first feature map relates to a background of a first image, and wherein the second feature map relates to a first object in the first image.

15. The NPU of claim 10, wherein the first feature map relates to a portion of a human body in a first image and the second feature map relates to a portion of a human face in the first image.

16. The NPU of claim 10, wherein the first feature map is used for a first machine analysis task, and wherein both the first feature map and the second feature map are used for a second machine analysis task.

17. The NPU of claim 10, wherein the at least one enhancement layer is included in one frame in an ascending order according to indexes of layers of the at least one enhancement layer.

18. The NPU of claim 10, wherein the bitstream is transmitted in unit of one frame, and wherein how many enhancement layers are to be included in the second data is determined based on a transmission channel.

19. An apparatus comprising: a first circuitry provided for at least one processing element (PE) to perform an inference using an artificial neural network and data included in a bitstream, wherein the data included in the bitstream comprises:

first data of a base layer, or the first data of the base layer and second data of at least one enhancement layer, wherein the first data of the base layer included in the bitstream includes a first feature map, wherein the second data of the at least one enhancement layer included in the bitstream includes a second feature map, wherein the first feature map and the second feature map are different from each other, but have a relationship, wherein the first feature map relates to a background of a first image and the second feature map relates to a privacy-sensitive portion in the first images wherein the first feature map is used for a first machine analysis task, and wherein both of the first feature map and the second feature map are used for a second machine analysis task.

20. An apparatus comprising: a first circuitry provided for at least one processing element (PE) to generate one or more feature maps using an artificial neural network, wherein the one or more feature maps are to be included in a bitstream, wherein the bitstream includes: first data of a base layer; or the first data of the base layer and second data of at least one enhancement layer, wherein the first data of the base layer included in the bitstream includes a first feature map, wherein the second data of the at least one enhancement layer included in the bitstream includes a second feature map, wherein the first feature map and the second feature map are different from each other, but have a relationship, wherein the first feature map relates to a background of a first image and the second feature map relates to a privacy-sensitive portion in the first images wherein the first feature map is used for a first machine analysis task, and wherein both of the first feature map and the second feature map are used for a second machine analysis task.

\* \* \* \* \*